(12) United States Patent
Jeon et al.

(10) Patent No.: US 10,504,490 B2
(45) Date of Patent: Dec. 10, 2019

(54) CONFIGURING THE DISPLAY OF PASSENGER INFORMATION IN A VEHICLE BASED ON WEIGHT AND VOICE

(71) Applicant: LG ELECTRONICS INC., Seoul (KR)

(72) Inventors: Jaebeom Jeon, Seoul (KR); Kyungdong Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/674,253

(22) Filed: Aug. 10, 2017

(65) Prior Publication Data
US 2018/0130449 A1 May 10, 2018

(30) Foreign Application Priority Data
Nov. 9, 2016 (KR) .......................... 10-2016-0148680

(51) Int. Cl.
G09G 5/14 (2006.01)
B60K 35/00 (2006.01)
B60N 2/00 (2006.01)
G09G 5/38 (2006.01)
H04L 29/06 (2006.01)
H04W 12/08 (2009.01)
(Continued)

(52) U.S. Cl.
CPC ............... *G09G 5/14* (2013.01); *B60K 35/00* (2013.01); *B60N 2/002* (2013.01); *G09G 5/38* (2013.01); *H04L 63/105* (2013.01); *H04W 12/08* (2013.01); *B60K 2370/11* (2019.05); *B60K 2370/148* (2019.05); *B60K 2370/1438* (2019.05); *B60K 2370/152* (2019.05); *B60K 2370/21* (2019.05); *B60K 2370/52* (2019.05); *B60K 2370/566* (2019.05);
(Continued)

(58) Field of Classification Search
None
See application file for complete search history.

(56) References Cited

U.S. PATENT DOCUMENTS

2004/0113797 A1* 6/2004 Osborne ................ B60N 2/002
340/573.4
2006/0217864 A1* 9/2006 Johnson ................ B60N 2/002
701/45
(Continued)

FOREIGN PATENT DOCUMENTS

| JP | 5723106 | 12/2011 |
|---|---|---|
| KR | 101558369 | 6/2015 |
| KR | 1020160057458 | 5/2016 |

OTHER PUBLICATIONS

PCT International Application No. PCT/KR2017/007939, Notification of Transmittal of the International Search Report and the Written Opinion of the International Searching Authority, or Declaration dated Nov. 9, 2017, 13 pages.

*Primary Examiner* — Kee M Tung
*Assistant Examiner* — Patrick F Valdez
(74) *Attorney, Agent, or Firm* — Lee Hong Degerman Kang & Waimey

(57) ABSTRACT

A display apparatus and a method for controlling the same are disclosed. The display apparatus provided in a vehicle according to one embodiment of the present invention comprises a memory; a display unit displaying one or more data areas on a screen; and a controller controlling the display unit to further display additional data area on the basis of at least one of recognition and identification of a passenger who boards on the vehicle.

7 Claims, 17 Drawing Sheets

(51) Int. Cl.
*G06K 9/00* (2006.01)
*G06F 3/14* (2006.01)

(52) U.S. Cl.
CPC .. *B60K 2370/589* (2019.05); *B60K 2370/736* (2019.05); *B60K 2370/739* (2019.05); *G06F 3/1423* (2013.01); *G06F 3/1454* (2013.01); *G06K 9/00838* (2013.01); *G09G 2340/0464* (2013.01); *G09G 2354/00* (2013.01); *G09G 2370/02* (2013.01); *G09G 2380/10* (2013.01)

(56) References Cited

U.S. PATENT DOCUMENTS

| | | | | |
|---|---|---|---|---|
| 2006/0251293 | A1* | 11/2006 | Piirainen | B60N 2/002 382/104 |
| 2008/0037803 | A1* | 2/2008 | Breed | H04R 5/02 381/86 |
| 2008/0068284 | A1* | 3/2008 | Watanabe | B60K 35/00 345/1.1 |
| 2009/0040196 | A1* | 2/2009 | Duckstein | B60K 35/00 345/204 |
| 2012/0053793 | A1* | 3/2012 | Sala | B60N 2/002 701/45 |
| 2014/0309806 | A1* | 10/2014 | Ricci | B60Q 1/00 701/1 |
| 2014/0309872 | A1* | 10/2014 | Ricci | H04W 4/21 701/36 |
| 2016/0077652 | A1 | 3/2016 | Yang | |
| 2016/0176372 | A1 | 6/2016 | Kim | |
| 2016/0216850 | A1* | 7/2016 | Ngai | G06F 9/451 |
| 2016/0355133 | A1* | 12/2016 | Kim | G02B 27/01 |
| 2017/0185266 | A1* | 6/2017 | Dai | B60K 35/00 |
| 2017/0185274 | A1* | 6/2017 | Ding | H01M 10/6566 |

* cited by examiner

Navigation Area

Your Passenger. Adult <Unknown>

⊕ Register

Function Authority
- ☑ Navigation control
- ☑ Temperature control
- ☑ Automatic driving control
- ☑ Audio control
- ☑ Maximum speed control
- ☑ Smartphone control ⚙ Setting

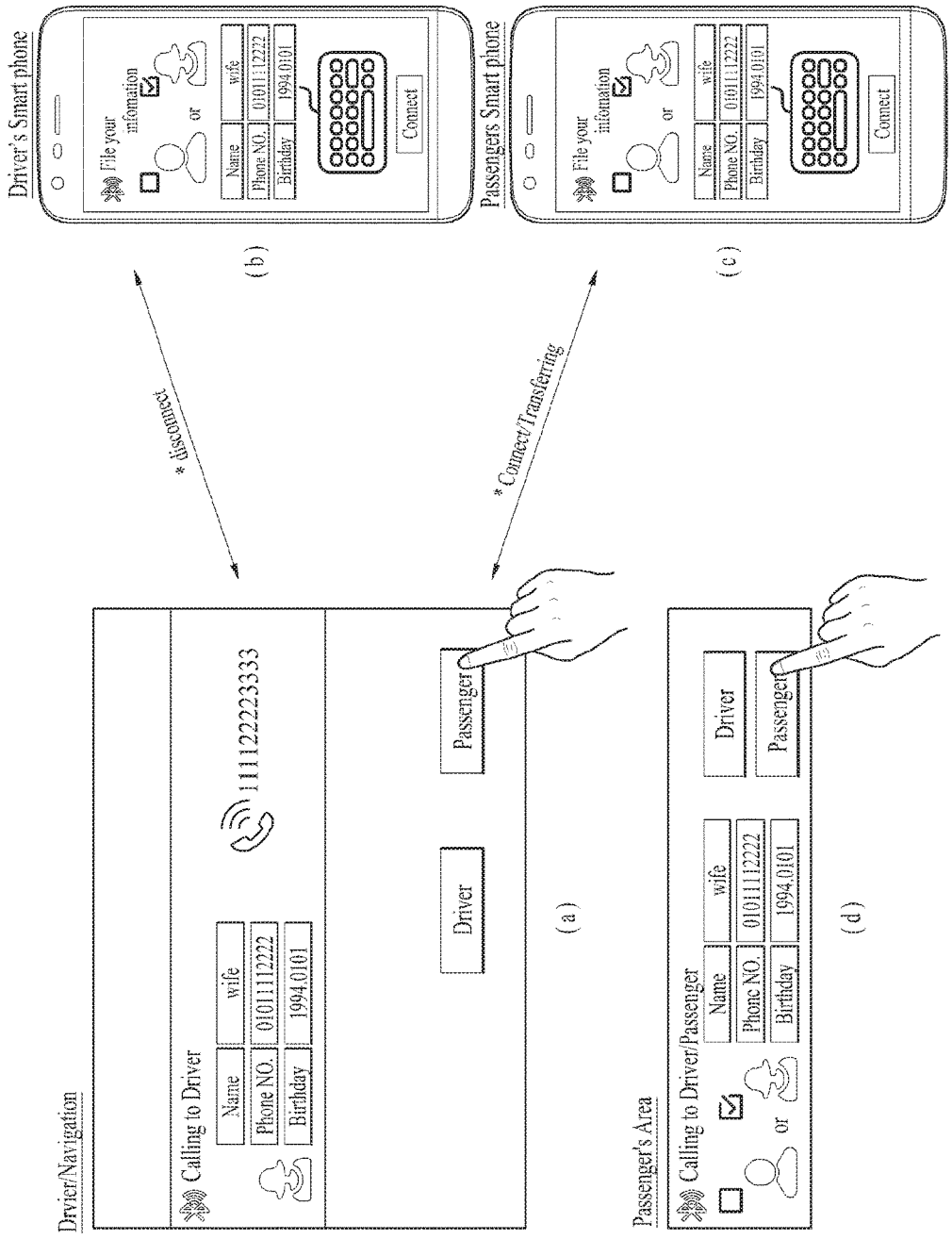

CONFIGURING THE DISPLAY OF PASSENGER INFORMATION IN A VEHICLE BASED ON WEIGHT AND VOICE

CROSS-REFERENCE TO RELATED APPLICATIONS

Pursuant to 35 U.S.C. § 119(a), this application claims the benefit of earlier filing date and right of priority to Korean Application No. 10-2016-0148680, filed on Nov. 9, 2016, the contents of which are all hereby incorporated by reference herein in its entirety.

BACKGROUND OF THE INVENTION

Field of the Invention

The present invention relates to a display, and more particularly, to a display apparatus provided in a vehicle and a method for controlling the same.

Discussion of the Related Art

A display apparatus includes all kinds of apparatuses such as an apparatus for receiving and outputting broadcasting, an apparatus for recording and playing video, and an apparatus for recording and playing audio. Examples of the display apparatus include TV, monitor, projector, and tablet.

As functions of the display apparatus become more diversified, the display apparatus is implemented in the form of a multimedia player having complicated functions such as capturing images or video, playing games, receiving broadcast signals, and the like in addition to functions of outputting broadcasting or reproducing video files. Also, the display apparatus is installed in a vehicle to improve a driver's convenience.

However, it is general that the conventional display apparatus installed in the vehicle has a fixed area and provides data for a driver only, such as vehicle functions. In other words, the conventional display apparatus installed in the vehicle has a problem in that it is difficult to provide a passenger, for example, fellow passenger except a driver with information.

SUMMARY OF THE INVENTION

Accordingly, the present invention discloses a display apparatus and a method for controlling the same to address the above-noted and other problems.

An object of the present invention is to provide a method for configuring and controlling a display of an advanced vehicle terminal.

Another object of the present invention is to provide a display of a vehicle terminal for recognizing/identifying passenger(s) except a driver in a vehicle and for the identified passenger(s).

Other object of the present invention is to provide convenience in using a vehicle of all passengers who get on the vehicle.

The technical objects that can be achieved through the present invention are not limited to what has been particularly described hereinabove and other technical objects not described herein will be more clearly understood by persons skilled in the art from the following detailed description.

This specification discloses various embodiments of a display apparatus and a method controlling the same.

To achieve these objects and other advantages and in accordance with the purpose of the specification, as embodied and broadly described herein, a display apparatus provided in a vehicle according to one embodiment of the present invention comprises a memory; a display unit displaying one or more data areas on a screen; and a controller controlling the display unit to further display additional data area on the basis of at least one of recognition and identification of a passenger who boards on the vehicle.

The technical solutions that can be achieved through the present invention are not limited to what has been particularly described hereinabove and other technical solutions not described herein will be more clearly understood by persons skilled in the art from the following detailed description.

The advantages effects of the present invention are as follows.

According to one of various embodiments of the present invention, a method for configuring and controlling a display of an advanced vehicle terminal may be provided.

According to another one of various embodiments of the present invention, a display of a vehicle terminal for recognizing/identifying passenger(s) except a driver in a vehicle and for the identified passenger(s) may be provided.

According to other one of various embodiments of the present invention, convenience in using a vehicle of all passengers who get on the vehicle may be provided.

The effects that can be achieved through the present invention are not limited to what has been particularly described hereinabove and other effects not described herein will be more clearly understood by persons skilled in the art from the following detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 20 is a diagram illustrating a method for processing a call when a driver or passenger receives the call during driving of a vehicle according to the present invention.

DETAILED DESCRIPTION OF THE PREFERRED EMBODIMENTS

Hereinafter, various embodiments of a display apparatus and a method for controlling the same according to the present invention will be described with reference to the accompanying drawings.

The suffixes "module" and "unit" for the elements used in this specification are given or used in common by considering facilitation in writing this disclosure only but fail to have meanings or roles discriminated from each other. Also, although the terms such as "first" and/or "second" in this specification may be used to describe various elements, it is to be understood that the elements are not limited by such terms. Although the terms used in this specification are selected from generally known and used terms considering their functions in the present specification, the terms may be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein. Meanwhile, the disclosure in this specification or/and the drawings is, but not limited to, the preferred embodiment according to the present invention, and its scope should be determined by claims.

Hereinafter, a display apparatus installed in a vehicle will be described as an example of a display apparatus related to the present invention. However, the scope of the present invention is not limited to the display apparatus.

Figure 1:
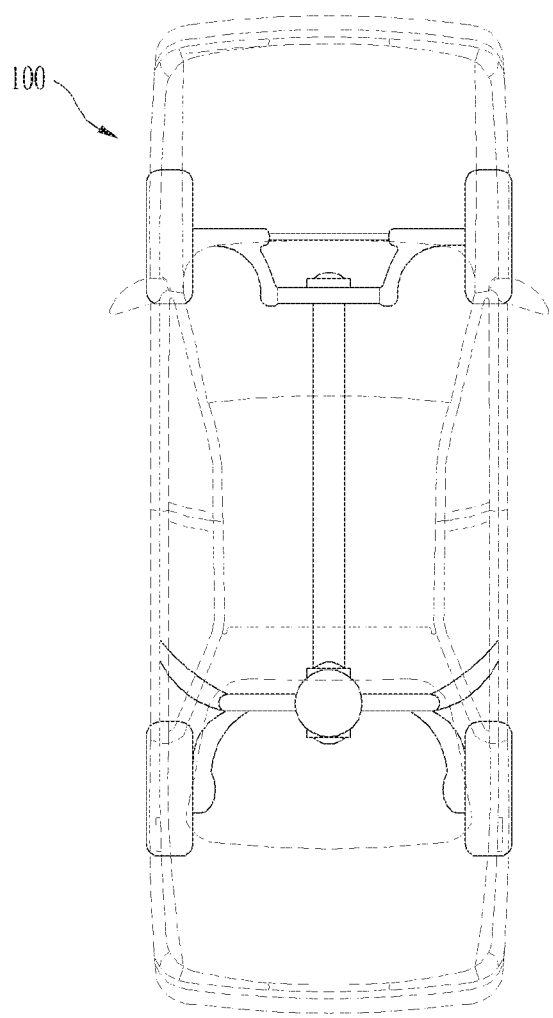
FIG. 1 is a brief diagram illustrating a vehicle including a display apparatus according to the present invention.

FIG. 1 is a brief diagram illustrating a vehicle including a display apparatus according to the present invention.

The embodiment of the present invention may be applied to pure electric vehicles, hybrid electric vehicles, etc. as well as general vehicles (for example, gasoline vehicle, diesel vehicle, gas vehicle, etc.). The hybrid electric vehicles (HEV) are provided with a battery pack comprised of a plurality of battery cells to receive a required power. It is required to uniformly maintain a voltage of each of the plurality of battery cells included in the battery pack to obtain stability, improve lifespan and obtain high output.

Figure 2:
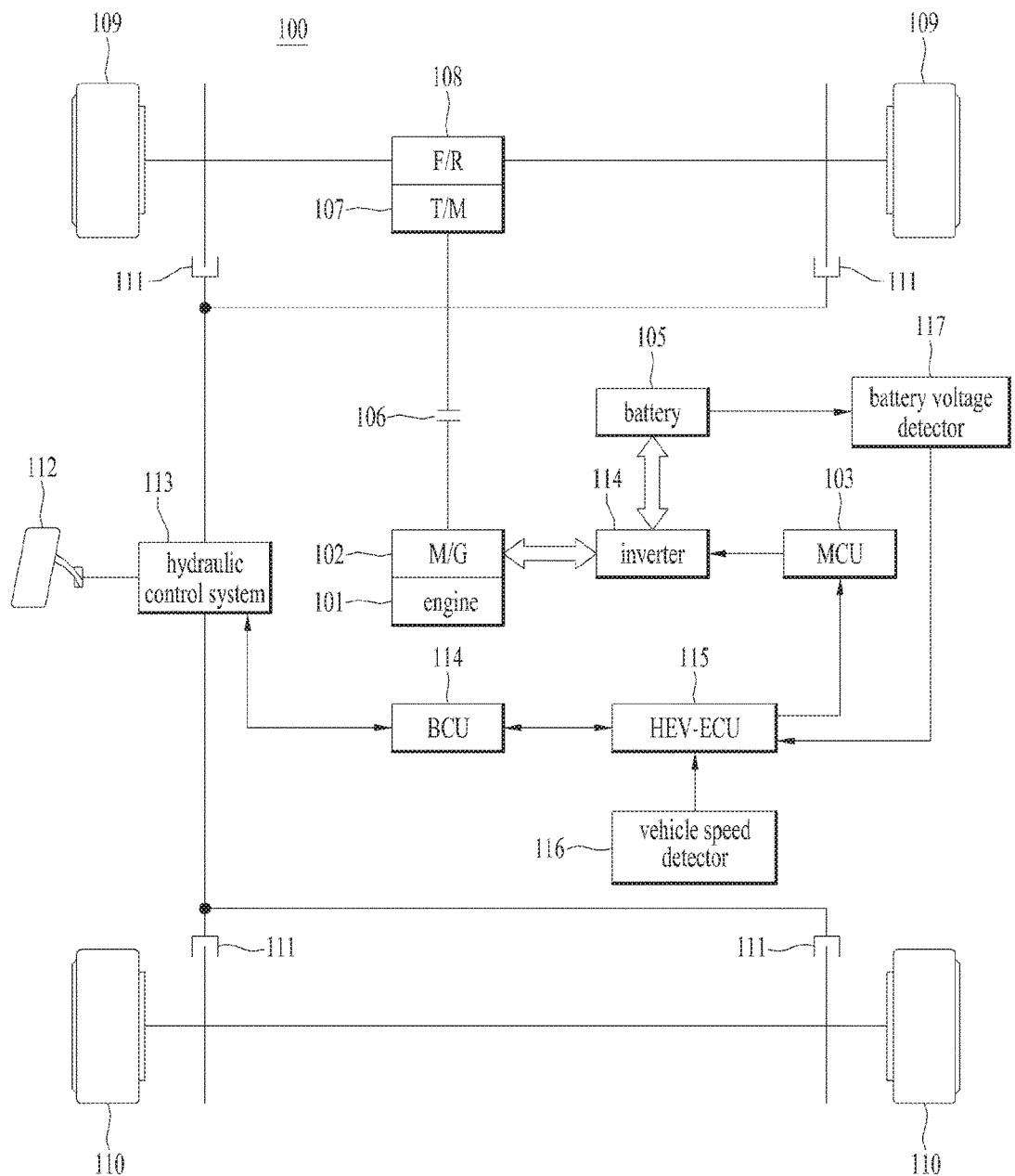
FIG. 2 is a schematic block diagram illustrating a vehicle including a display apparatus according to the present invention.

FIG. 2 is a schematic block diagram illustrating a vehicle including a display apparatus according to the present invention.

As shown in FIG. 2, a vehicle 100 according to one embodiment of the present invention includes an engine 101 as a power source and a motor/generator unit 102 (hereinafter, abbreviated as "M/G unit"). A driven wheel driven by the power source is a front-wheel in a front-wheel drive vehicle, and is a rear-wheel in a rear-wheel drive vehicle. However, the front-wheel drive vehicle will be described hereinafter. The embodiment related to the rear-wheel drive vehicle will be apparent from the following description related to the front-wheel drive vehicle.

It will be apparent to those skilled in the art that the M/G unit 102 is a device that selectively serves as a motor or a generator depending on a driven state. Therefore, in the following description, although the M/G unit 102 may be used as titles such as motor and generator, it is to be understood that the titles refer to the same element. The engine 101 and the motor 102 of the electric vehicle are connected to a transmission in series.

The M/G unit 102 is driven by a signal of an inverter 104 under the control of a motor control unit (MCU) 103.

The inverter 104 drives the M/G unit 102 as a power source by using electric energy stored in a battery 105 under the control of the MCU 103, and if the inverter 104 drives the M/G unit 102 as a generator, the inverter 104 charges electric energy generated by the M/G unit 102 in the battery 105.

A power of the engine 101 and the M/G unit 102 is delivered to the transmission (T/M) 107 through a clutch 106, and is delivered to a front wheel 109 through a final drive gear (F/R) 108. A rear wheel 110 is a non-driven wheel which is not driven by the engine 101 and the M/G unit 102.

Each of the front wheel 109 and the rear wheel 110 is interposed with a wheel brake apparatus 111 for reducing a rotational speed of each wheel. TO drive each wheel brake apparatus 111, each of the front wheel 109 and the rear wheel 110 includes a brake pedal 112 and a hydraulic control system 113 for hydraulic-controlling each wheel brake apparatus 111 on the basis of a hydraulic pressure generated in accordance with manipulation of the brake pedal 112. The electric vehicle includes a brake control unit (BCU) 114 for controlling the hydraulic control system 113 and receiving a brake control state from the hydraulic control system 113.

The BCU 114 detects a hydraulic pressure generated from the hydraulic control system 113 when a driver manipulates the brake pedal 112. The BCU 114 generates a braking force, which will be applied to a drive wheel (for example, front wheel 109), on the basis of the detected hydraulic pressure, especially generates a hydraulic braking force, which will be braked by the hydraulic pressure, and a regeneration braking force, which will be braked by regeneration brake. Therefore, the BCU 114 supplies the generated hydraulic braking force to the wheel brake apparatus 111 of the front wheel 109 through a control of the hydraulic control system 113.

The electric vehicle includes a hybrid electric vehicle electronic control unit (HEV-ECU) 115 that controls the BCU 114 and the MCU 104 by performing communication with the BCU 114 and the MCU 104, whereby the electric vehicle for performing a maximum speed limit method may be implemented.

The regeneration braking force generated by the BCU 114 is delivered to the HEV-ECU 115, whereby the HEV-ECU 115 controls the MCU 103 on the basis of the received generation braking force. Therefore, the MCU 103 drives the M/G unit 102 as a generator to implement the regeneration braking force designated from the HEV-ECU 115. At this time, electric energy generated by the M/G unit 102 is stored in the battery 105.

The electric vehicle further includes a vehicle speed detector 116 that detects a vehicle speed.

The HEV-ECU 115 uses the vehicle speed detected from the vehicle speed detector 116 as data for controlling the BCU 114 and the MCU 103.

Also, the electric vehicle includes a battery voltage detector 117 that detects a voltage of the battery 105. The battery voltage detector 117 detects a current voltage of the battery 105, and provides resultant data to allow the HEV-ECU 115 to limit a maximum speed of the electric vehicle in accordance with a deviation between the detected current voltage and a predetermined reference voltage.

Hereinafter, a configuration of a terminal 200 in a vehicle for describing the embodiment of the present invention will be described with reference to FIG. 3.

Figure 3:
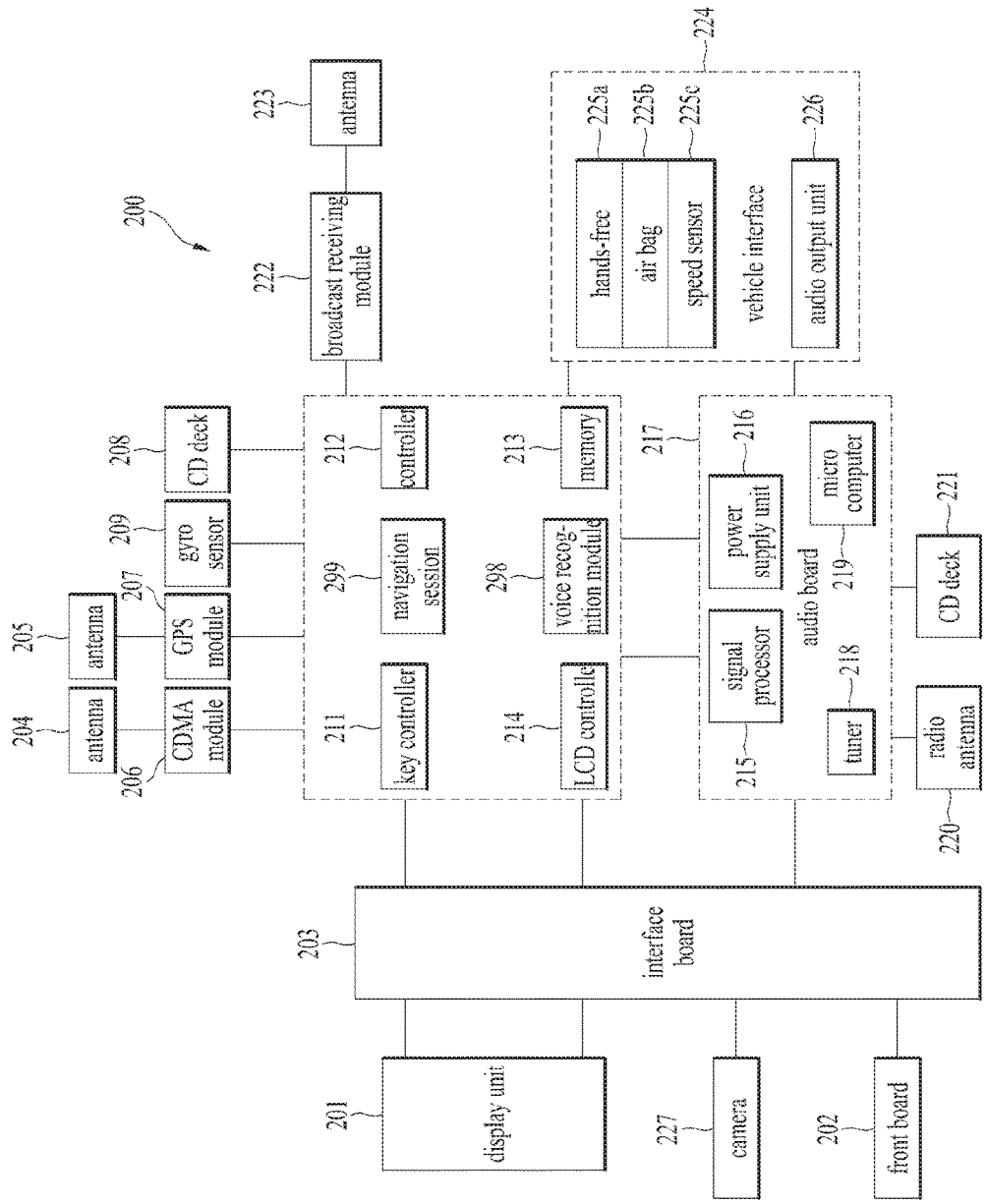
FIG. 3 is a schematic block diagram illustrating a configuration of a terminal 200 in a vehicle according to the present invention.

FIG. 3 is a schematic block diagram illustrating a configuration of a terminal 200 in a vehicle according to the present invention.

As shown in FIG. 3, the terminal 200 includes a controller 212 (for example, central processing unit (CPU)) for controlling the terminal 200 on the whole, a memory 213 for storing various kinds of information, a key controller 211 for controlling various key signals, and a main board 210 in which a display controller 214 for controlling the display is built.

The memory 213 stores map information (map data) for displaying map guide information on a digital map. Also, the memory 213 stores a traffic information collection control algorithm for inputting traffic information according to conditions of the road on which a vehicle is currently driving and information for controlling the algorithm.

The main board includes a communication module 206 which is a mobile communication terminal having a unique device number, built in a vehicle, a GPS (global positioning system) module 207 for receiving a GPS signal for position guide of a vehicle and driving path tracing from a departure place to a destination place or transmitting traffic information collected by a user as the GPS signal, an audio deck 208 for playing a signal recorded in an audio recording medium, and a gyro sensor 209. The communication module 206 and the GPS module 207 transmit and receive a signal through antennas 204 and 205.

Also, a broadcast receiving module 222 is connected to the main board 210, and receives a broadcast signal through the antenna 223. The a display unit 201 controlled by the display controller 214 through an interface board 203, a front board 202 controlled by the key controller 211 and a camera 227 for taking the inside and/or the outside of the vehicle are connected to the main board 210.

The display unit 201 displays various video signals and text message signals, and the front board 202 includes buttons for input of various key signals, and provides a key signal corresponding to a button selected by a user to the main board 210. Also, the display unit 201 includes a proximity sensor and a touch sensor (touch-screen) of FIG. 2. The display unit 201 may be a head up display (HUD) or a vehicle cluster.

The front board 202 includes a menu key for direct input of traffic information, wherein the menu key may be configured to be controlled by the key controller 211.

The audio board 217 is connected with the main board, and processes various audio signals. The audio board 217 includes a microcomputer 219 for controlling the audio board 217, a tuner 218 for receiving a radio signal, a power source unit 216 for supplying a power source to the microcomputer 219, and a signal processor 215 for processing various audio signals.

Also, the audio board 217 includes a radio antenna 220 for receiving a radio signal, and an audio deck 221 for playing an audio signal of an audio recording medium. The audio board 217 may further include an audio output unit (for example, amplifier) 226 for outputting the audio signal which is processed by the audio board 217.

The audio output unit (amplifier) 226 is connected to a vehicle interface 224. That is, the audio board 217 and the main board are connected to the vehicle interface 224. A hands free 225*a* for inputting audio signal, an air back 225*b* for passenger safety, and a speed sensor 225*c* for detecting a speed of a vehicle may be connected to the vehicle interface 224. The speed sensor 225*c* calculates a vehicle speed, and provides the calculated vehicle speed information to the central processing unit 212.

A navigation session 299 applied to the terminal 200 generates road guide information on the basis of map data and vehicle current position information, and notifies the generated road guide information to a user.

The display unit 201 senses a proximity touch within a display window through a proximity sensor. For example, the display unit 201 detects a position of the proximity touch when a pointer (for example, finger or stylus pen) is subjected to the proximity touch, and outputs position information corresponding to the detected position to the controller 212.

A voice recognition device (or voice recognition module) 298 recognizes voice uttered by a user and performs a corresponding function in accordance with the recognized voice signal.

The navigation session 299 applied to the terminal 200 displays a driving path on the map data, and automatically forms a wireless network with a terminal (for example, vehicle navigation device) installed in a peripheral vehicle and/or a mobile terminal with which a peripheral pedestrian carries, through wireless communication (for example, short-range wireless communication network) when a position of the mobile terminal is within a predetermined distance from a blind spot included in the driving path, thereby receiving position information of the peripheral vehicle from the terminal installed in the peripheral vehicle and receiving position information of the peripheral pedestrian from the mobile terminal with which the peripheral pedestrian carries.

The mobile terminal described in this specification may include a cellular phone, a smart phone, a laptop computer, a digital broadcast terminal, a personal digital assistant (PDA), a portable multimedia player (PMP), a navigator, a slate PC, a tablet PC, an ultrabook, a wearable device (for example, a smart watch, a smart glass, a head mounted display (HMD)), etc.

The mobile terminal may perform data communication with a vehicle through wired/wireless network. The wired or wireless network includes all kinds of hardware and/or software for pairing or/and connection and data communication between the vehicle and the mobile terminal, and also includes networks which will be supported by the standard now as well as in the future. Meanwhile, the wired/wireless network may support one or more communication protocols for data communication. Examples of the wired or wireless network may include wired network supported by various telecommunication standards or protocols, such as Universal Serial Bus (USB), Composite Video Banking Sync (CVBS), Component, S-Video (analog), Digital Visual Interface (DVI), High Definition Multimedia Interface (HDMI), RGB, and D-SUB, and wireless network supported by various telecommunication standards or protocols, such as Bluetooth, Wireless LAN (WLAN) (Wi-Fi), Wi-Fi direct, Radio Frequency Identification (RFID), infrared Data Association (IrDA), Ultra Wideband (UWB), ZigBee, Digital Living Network Alliance (DLNA), Wireless broadband (Wibro), World Interoperability for Microwave Access (Wimax), High Speed Downlink Packet (HSDPA), and Long Term Evolution/LTE-Advanced (LTE/LTE-A).

Figure 4:
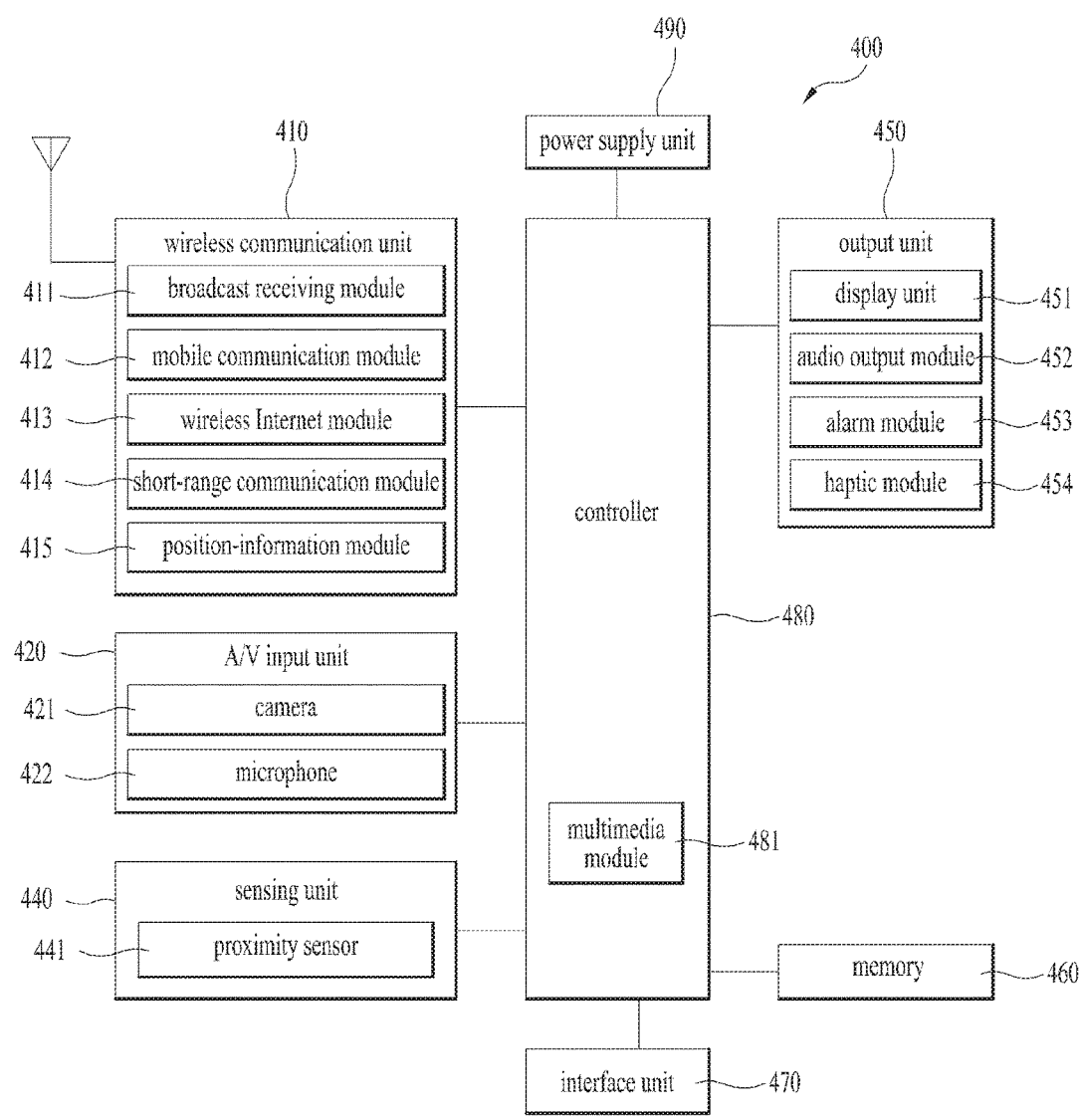
FIG. 4 is a schematic block diagram illustrating a mobile terminal that performs data communication with a terminal 200 in a vehicle according to the present invention.

FIG. 4 is a schematic block diagram illustrating a mobile terminal that performs data communication with a terminal 200 in a vehicle according to the present invention.

Referring to FIG. 4, the mobile terminal 400 may include a wireless communication unit 410, an audio/video (A/V) input unit 420, a user input unit 430, a sensing unit 440, an output unit 450, a memory 460, an interface unit 470, a controller 480, and a power supply unit 490.

The wireless communication unit 410 may include one or more modules which permit wireless communication between the mobile terminal 400 and a wireless communication system or between the mobile terminal and a network within which the mobile terminal 400 is located. For instance, the wireless communication unit 410 may include a broadcast receiving module 411, a mobile communication module 412, a wireless Internet module 413, a short-range communication module 414, and a position-information module 415.

The broadcast receiving module 411 receives a broadcast signal and/or broadcast associated information from an external broadcast managing server via a broadcast channel. The broadcast channel may include a satellite channel and a terrestrial channel. The broadcast managing server may mean a server which generates and transmits a broadcast signal and/or broadcast associated information or a server which is provided with a previously generated broadcast signal and/or broadcast associated information and then transmits the provided signal or information to a terminal. The broadcast signal may include a TV broadcast signal, a radio broadcast signal, and/or a data broadcast signal, and may further include a data broadcast signal combined with a TV or radio broadcast signal. The broadcast associated information may include information associated with a broadcast channel, a broadcast program, or a broadcast service provider. Furthermore, the broadcast associated information may be provided via a mobile communication network. In this case, the broadcast associated information may be received by the mobile communication module 412. The broadcast associated information may include data for generating and outputting electronic program guide (EPG) and an electronic service guide (ESG). The broadcast receiving module 411 may receive broadcast signals by using various types of broadcast systems such as ATSC, digital video broadcasting-terrestrial (DVB-T), digital video broadcasting-satellite (DVB-S), media forward link only (MediaFLO), digital video broadcast-handheld (DVB-H), and integrated services digital broadcast-terrestrial (ISDB-T). Optionally, the broadcast receiving module 411 may be configured to be suitable for other broadcasting systems as well as the above-noted digital broadcasting systems. The broadcast signal and broadcast associated information received by the broadcast receiving module 411 may be stored in the memory 460.

The mobile communication module 412 transmits and receives wireless signals to and from at least one of a base station, an external terminal, and a server on a mobile communication network. The wireless signals may include audio signals, video call signals, or various types of data based on transmission and reception of text/multimedia message.

The wireless Internet module 413 includes a module for wireless Internet connection, and may be built in or outside the mobile terminal 400. The wireless Internet technology may include WLAN (Wireless LAN) (Wi-Fi), Wibro (Wireless broadband), Wimax (World Interoperability for Microwave Access), HSDPA (High Speed Downlink Packet Access), etc.

The short-range communication module 414 means a module for short-range communications. Suitable technologies for implementing this short-range communication include Bluetooth, radio frequency identification (RFID), infrared data association (IrDA), ultra-wideband (UWB), ZigBee, RS-232, RS-485, etc.

The position-information module 415 is a module for acquisition of position information of the mobile terminal 400. An example of the position-information module 415 may include a global positioning system (GPS) module.

The audio/video (A/V) input unit 420 is configured for audio or/and video signal input. Examples of the A/V input unit 420 may include a camera 421 and a microphone 422. The camera 421 processes image frames of still pictures or video, which are obtained by an image sensor in a video call mode or a photographing mode. Furthermore, the processed image frames may be displayed on the display unit 451.

The image frames processed by the camera 421 may be stored in the memory 460 or may be transmitted to an external recipient via the wireless communication unit 410. Optionally, at least two cameras 421 may be provided in the mobile terminal 400 depending on the environment of usage.

The microphone 422 receives an external audio signal in a phone call mode, a recording mode or a voice recognition mode and processes the received audio signal to electric audio data. The processed audio data is transformed into a format transmittable to a mobile communication base station via the mobile communication module 412 in a call mode. The microphone 422 may include assorted noise removing algorithms to remove noise generated in the course of receiving the external audio signal.

The user input unit 430 generates input data responsive to user manipulation for operation control of the terminal. Examples of the user input unit 430 include a keypad, a dome switch, a touchpad (e.g., static pressure/capacitance), a jog wheel, and a jog switch.

The sensing unit 440 provides sensing signals for controlling operations of the mobile terminal 400 by sensing the current status of the mobile terminal 400, such as an open/closed status of the mobile terminal 400, the relative positioning of the mobile terminal 400, a presence or absence of user contact with the mobile terminal 400, an orientation of the mobile terminal 400, or acceleration/deceleration of the mobile terminal 400. For example, if the mobile terminal 400 moves or is inclined, the sensing unit 440 may sense the position or inclination of the mobile terminal 400. Also, the sensing unit 440 may sense the presence or absence of power supply provided by the power supply unit 490, and the presence or absence of a coupling or other connection between the interface unit 470 and an external device. Meanwhile, the sensing unit 440 may include a proximity sensor 441 including NFC (Near Field Communication).

The output unit 450 generates output relevant to the senses of sight, hearing, and touch. Furthermore, the output unit 450 may include the display unit 451, an audio output module 452, an alarm unit 453, and a haptic module 454.

The display unit 451 displays (outputs) information processed by the mobile terminal 400. For example, if the mobile terminal is operating in a phone call mode, the display unit 451 displays a user interface (UI) or graphical user interface (GUI) related to call. If the mobile terminal 400 is in a video call mode or a photographing mode, the display unit 451 displays images which are associated with these modes, the UI or the GUI.

The display unit 451 may include at least one of a liquid crystal display (LCD), a thin film transistor-liquid crystal display (TFT-LCD), an organic light-emitting diode display (OLED), a flexible display and a three-dimensional display.

Some of the displays may be implemented in a transparent or optical transmittive type, i.e., a transparent display. A representative example of the transparent display is a TOLED (transparent OLED). A rear configuration of the display unit 451 may be implemented as the optical transmittive type as well. In this configuration, a user may see an object located at the rear of a terminal body through a portion of the display unit 451 of the terminal body.

At least two display units 451 may be provided in the mobile terminal 400 in accordance with one embodiment of the mobile terminal 400. For example, a plurality of display units may be arranged to be spaced apart from each other or to form a single body on a single face of the mobile terminal 400. Alternatively, a plurality of display units may be arranged on different faces of the mobile terminal 400.

If the display unit 451 and a sensor for detecting a touch action (hereinafter, referred to as 'touch sensor') are configured as a mutual layer structure (hereinafter, referred to as 'touch screen'), the display unit 451 is usable as an input device as well as an output device. In this case, the touch sensor may be configured as a touch film, a touch sheet, or a touch pad.

The touch sensor may be configured to convert a pressure applied to a specific portion of the display unit 451 or a variation of capacitance generated from a specific portion of the display unit 451 to an electric input signal. Moreover, the touch sensor may be configured to detect a pressure of a touch as well as a touched position or area.

If a touch input is made to the touch sensor, a signal(s) corresponding to the touch input is(are) transferred to a touch controller. The touch controller processes the signal(s) and then transfers the processed signal(s) to the controller 480. Therefore, the controller 480 may identify the touched area of the display unit 451.

The proximity sensor 441 may be arranged at an internal area of the mobile terminal 400 enclosed by the touch screen or around the touch screen. The proximity sensor is a sensor that detects a presence or non-presence of an object approaching a predetermined detecting surface or an object existing around the proximity sensor using an electromagnetic field strength or infrared ray without mechanical contact. Hence, the proximity sensor 441 is more durable than a contact type sensor and also has utility broader than that of the contact type sensor.

Examples of the proximity sensor 441 include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) may be considered as the proximity sensor.

For clarity and convenience of description, an action for enabling the pointer approaching the touch screen to be recognized as placed on the touch screen without contacting the pointer on the touch screen may be referred to as 'proximity touch' and an action of enabling the pointer to actually come into contact with the touch screen may be referred to as 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch direction, a proximity touch speed, a proximity touch time, a proximity touch position, and a proximity touch shift state). Information corresponding to the detected proximity touch action and the detected proximity touch pattern may be output to the touch screen.

The audio output module 452 functions in various modes including a call-receiving mode, a call-placing mode, a recording mode, a voice recognition mode, and a broadcast reception mode to output audio data which is received from the wireless communication unit 410 or is stored in the memory 460. The audio output module 452 outputs audio signal related to a particular function (e.g., call received sound, message received sound) performed in the mobile terminal 400. The audio output module 452 may include receivers, speakers, buzzers, etc.

The alarm unit 453 outputs a signal for announcing the occurrence of a particular event associated with the mobile terminal 400. Examples of the event generated in the mobile terminal include a call signal reception, a message reception, a key signal input, and a touch input. The alarm unit 453 is able to output a signal for announcing the event occurrence by way of vibration as well as video or audio signal. The video or audio signal may be output via the display unit 451 or the audio output module 452. Hence, the display unit 451 or the audio output module 452 may be regarded as a part of the alarm unit 453.

The haptic module 454 generates various tactile effects that can be sensed by a user. Vibration is a representative one of the tactile effects generated by the haptic module 454. The strength and pattern of the vibration generated by the haptic module 454 are controllable. For instance, different vibrations may be output in a manner of being synthesized together or may be output in sequence. The haptic module 454 is able to generate various tactile effects as well as the vibration, such as an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device. The haptic module 454 may be implemented to enable a user to sense the tactile effect through a muscle sense of a finger or an arm as well as to transfer the tactile effect through direct contact. Optionally, at least two haptic modules 454 may be provided in the mobile terminal 400 in accordance with an embodiment of the mobile terminal 400.

The memory 460 may store a program for the operation of the controller 480, and temporarily store input and output data (e.g., phone book, message, still image, video, etc.).

The memory 460 may store data related to vibration and audio of various patterns output during a touch input on the touch screen.

The memory 460 may include at least one of a flash memory type, a hard disk type, a multimedia card micro type, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disk. The mobile terminal 400 is able to operate in association with a web storage for performing a storage function of the memory 460 on the Internet.

The interface unit 470 serves to couple the mobile terminal 400 with all external devices. The interface unit 470 receives data from the external devices or is supplied with power and then transfers the data or power to the respective elements of the mobile terminal 400 or enables data within the mobile terminal 400 to be transferred to the external devices. For example, the interface unit 470 may include a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 400 and may include a User Identify Module (UIM), a Subscriber Identity Module (SIM), and a Universal Subscriber Identity Module (USIM). A device having the identity module (hereinafter, referred to as 'identity device') may be manufactured as a smart card. Therefore, the identity device may be connected to the mobile terminal 400 via the corresponding port.

When the mobile terminal 400 is connected to an external cradle, the interface unit 470 becomes a passage for supplying the mobile terminal 400 with a power from the cradle or a passage for delivering various command signals input from the cradle by a user to the mobile terminal 400. Each of the various command signals input from the cradle or the power may be operated as a signal enabling the mobile terminal 400 to recognize that it is correctly loaded in the cradle.

The controller 480 controls the overall operations of the mobile terminal 400. For example, the controller 480 performs the control and processing associated with voice calls, data communications, and video calls. The controller 480 may include a multimedia module 481 that provides multimedia playback. The multimedia module 481 may be configured as a part of the controller 480, or implemented as a separate component. Moreover, the controller 480 is able to perform a pattern recognition process for recognizing a writing input and a picture drawing input carried out on the touch screen as characters or images, respectively.

The power supply unit 490 provides external power or internal power required by various components of the mobile terminal 400 under the control of the controller 380.

Various embodiments described herein may be implemented in a computer-readable medium using, for example, computer software, hardware, or some combination of computer software and hardware.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 480.

For a software implementation, the embodiments described herein may be implemented with separate software modules, such as procedures and functions, each of which performs one or more of the functions and operations described herein. The software codes can be implemented with a software application written in any suitable programming language and can be stored in the memory 460, and executed by the controller 480.

Meanwhile, a wearable device, which may be worn on a body of a user instead of holding it with a user's hand, may operate or function as a digital device or external device in this specification. Examples of the wearable device include a smart watch, a smart glass, and an HMD.

As shown in FIG. 1, the wearable device may mutually exchange (or interwork) data with other device. The short-range communication module 414 may sense (or recognize) a wearable device, which enables communication, around the mobile terminal 400. Moreover, the controller 480 may transmit at least a part of data processed by the mobile terminal 400 to the wearable device through the short-range communication module 414 if the sensed wearable device is a device authorized to perform communication with the mobile terminal 400. Therefore, the user may use the data processed by the mobile terminal 400 through the wearable device. For example, if a call is received in the mobile terminal 400, the user may perform communication of the call through the wearable device, or if a message is received in the mobile terminal 400, the user may check the received message through the wearable device.

Figure 5:
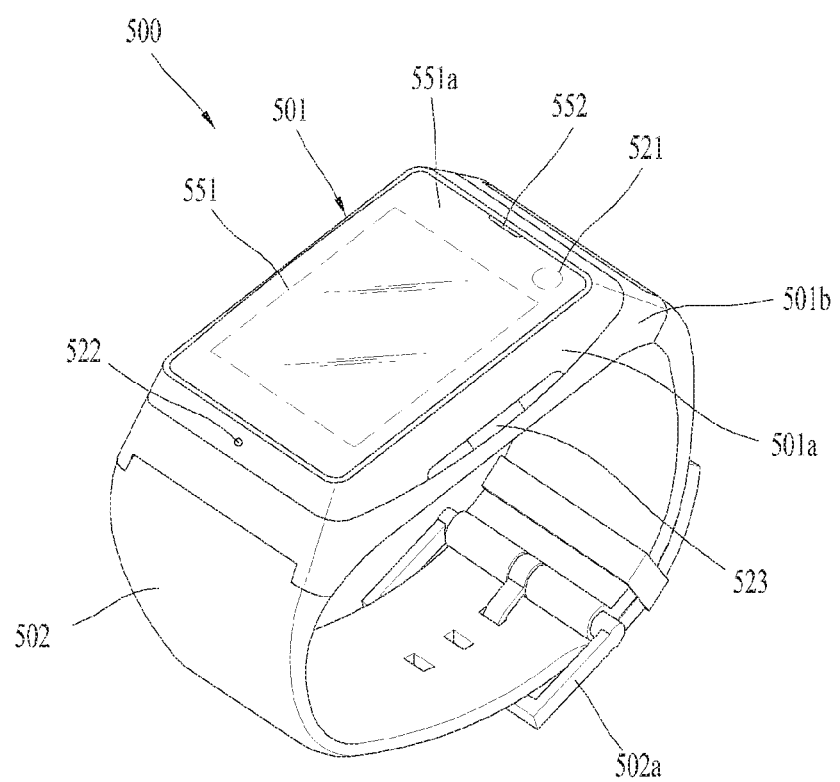
FIG. 5 is another schematic block diagram illustrating a mobile terminal that performs data communication with a terminal 200 in a vehicle according to the present invention.

FIG. 5 is another schematic block diagram illustrating a mobile terminal that performs data communication with a terminal 200 in a vehicle according to the present invention.

Referring to FIG. 5, a watch type mobile terminal, that is, smart watch 500 includes a main body 501 having a display unit 551, and a band 502 connected to the main body 501 and configured to be word on a wrist of a user. Generally, the smart watch 500 may include characteristics of the mobile terminal 400 or similar characteristics thereof.

The main body 501 includes a case forming external appearance. As shown, the case may include a first case 501a and a second case 501b, each of which provides an inner space for receiving various electronic components. However, the present invention is not limited to this example, and one case may be configured to provide the inner space, whereby the mobile terminal 500 of a uni-body may be implemented.

The smart watch 500 may be configured to enable wireless communication, and an antenna for wireless communication may be installed in the main body 501. Meanwhile, the antenna may expand its performance by using the case. For example, a case including a conductive material may electrically be connected with the antenna to enlarge a ground area or radiation area.

The display unit 551 may be arranged on a front surface of the main body 501 to output information, and may include a touch sensor to be implemented as a touch screen. As shown, a window 551a of the display unit 551 may be installed in the first case 501a to form a front surface of the terminal body together with the first case 501a.

The main body 501 may include an audio output unit 552, a camera 521, a microphone 522, and a user input unit 523. If the display unit 551 is implemented as a touch screen, the display unit 551 may function as the user input unit 523, whereby a separate key may not be provided in the main body 501.

The band 502 may be configured to be worn on a wrist of a user to surround the wrist of the user, and may be formed of a flexible material to facilitate wearing. As such, the band 502 may be formed of a material such as leather, rubber, silicon, and synthetic resin. Also, the band 502 may be configured to be detachably provided in the main body 501 to allow the user to exchange the band with various types of other bands in accordance with the user's taste.

Meanwhile, the band 502 may be used to enlarge performance of the antenna. For example, a ground extension portion (not shown) electrically connected to the antenna to extend the ground area may be built in the band.

The band 502 may include a fastener 502a. The fastener 502a may be implemented by a hook structure for snap-fit, Velcro, etc., and may include a flexible area or material. In this drawing, the fastener 502a is implemented in the form of a buckle.

Hereinafter, various embodiments the display apparatus and the method for controlling the same according to the present invention will be described in more detail. For convenience, since the display apparatus is installed in a vehicle, the display apparatus will be described as a vehicle terminal. The vehicle terminal may perform data communication with the mobile terminal described in FIGS. 4 and 5.

Figure 6:
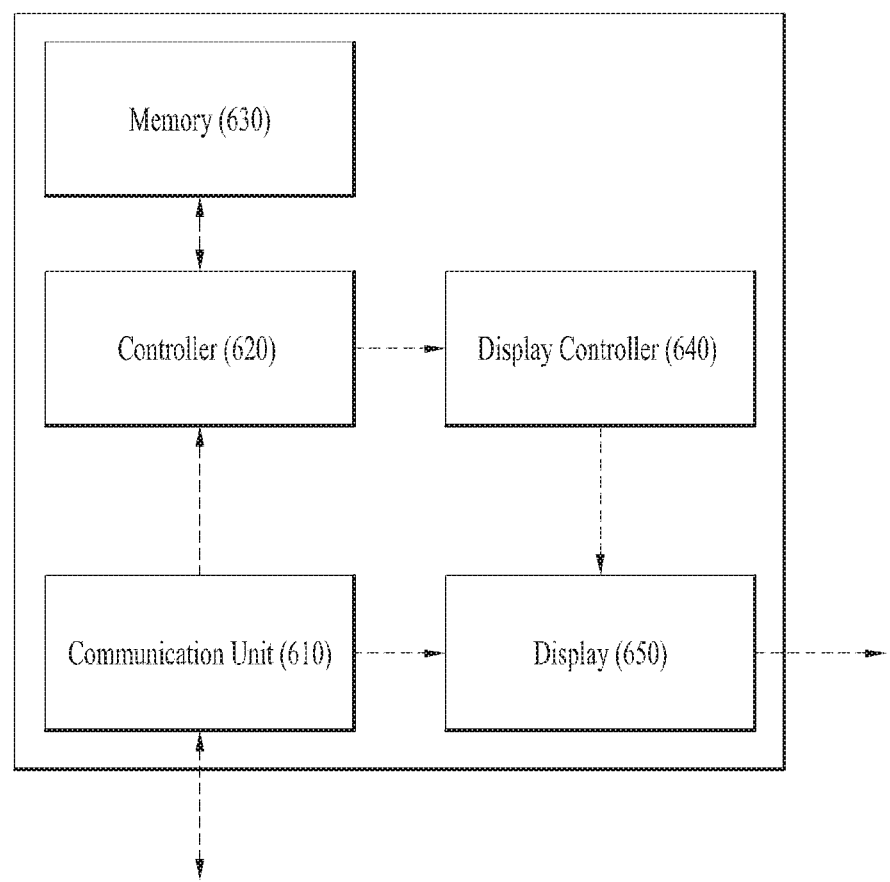
FIG. 6 is a schematic block diagram illustrating a display control of a vehicle terminal according to the present invention.

FIG. 6 is a schematic block diagram illustrating a display control of a vehicle terminal according to the present invention.

The display apparatus provided in a vehicle according to one embodiment of the present invention includes a memory, a display unit for displaying one or more data areas on a screen, and a controller for controlling the display unit to further display additional data area on the basis of at least one of recognition and identification of a passenger who gets on the vehicle.

The data area may include a driver data area for driving of a driver, a driving assist data area for assisting driving of the driver, or a passenger data area for a passenger.

The controller may control the display to include at least one of the driver data area and the driving assist data area if only the driver exists in the vehicle.

The controller may control the display to include the passenger data area in addition to at least one of the driver data area and the driving assist data area if the passenger in addition to the driver exists in the vehicle.

The controller may recognize/identify the passenger through at least one of a weight sensor provided in each seat of the vehicle, a camera sensor provided in the vehicle and the mobile terminal subjected to pairing.

The controller may control the display to change the position where the driver data area, the driving assist data area or the passenger data area is provided.

The controller may control the display to configure the passenger data area on the basis of registration information on a vehicle passenger, which is stored in the memory, and may control the display to change data or setup of each data area provided through the display unit on the basis of state data inside/outside the vehicle.

The controller may determine a priority of the driver of the vehicle and the passenger of the vehicle and reconfigure the data area of the display area on the basis of the determined priority.

The controller may configure data area access authority of the display unit differently depending on the recognized/identified passenger or the determined priority.

Referring to FIG. 6, for vehicle terminal display control, the vehicle includes a communication unit 610, a controller 620, a memory 630, and a display unit 650. In this case, the vehicle may further include a separate display controller 640 for controlling the display unit.

The communication unit 610 provides an interfacing environment for various kinds of data transmission and reception, such as a touch input for the display unit inside and outside the vehicle.

The controller 620 performs an overall control of the vehicle as well as respective components of FIG. 6. Particularly, the controller 620 may control the display unit 650 through the display controller 640 or directly control the display unit 650 in the present invention. Its detailed description will be described later. Meanwhile, if the vehicle is mentioned, the vehicle may mean the controller 620.

The memory 630 stores various data under the control of the controller 620. In this way, as one of data stored in the memory 630, passenger registration information which will be described later may be included.

The display unit 650 is a component for performing an overall operation of a display of the vehicle terminal provided on a dashboard of the vehicle according to the present invention. The display of the vehicle terminal may be implemented as a touchable screen such as touch-screen. The display unit 650 may be provided in such a manner that one or more data areas are configured on the screen under the control of the controller 620. The data area may include a driver data area related to main driving functions of the driver, a driving assist data area for driving assistance of the driver, and a passenger data area related to a passenger of the vehicle when the passenger of the vehicle exists.

Hereinafter, the vehicle terminal may mean at least one vehicle component supporting the display apparatus as well as the display apparatus for outputting data within the vehicle, that is, the vehicle display unit.

Figure 7:
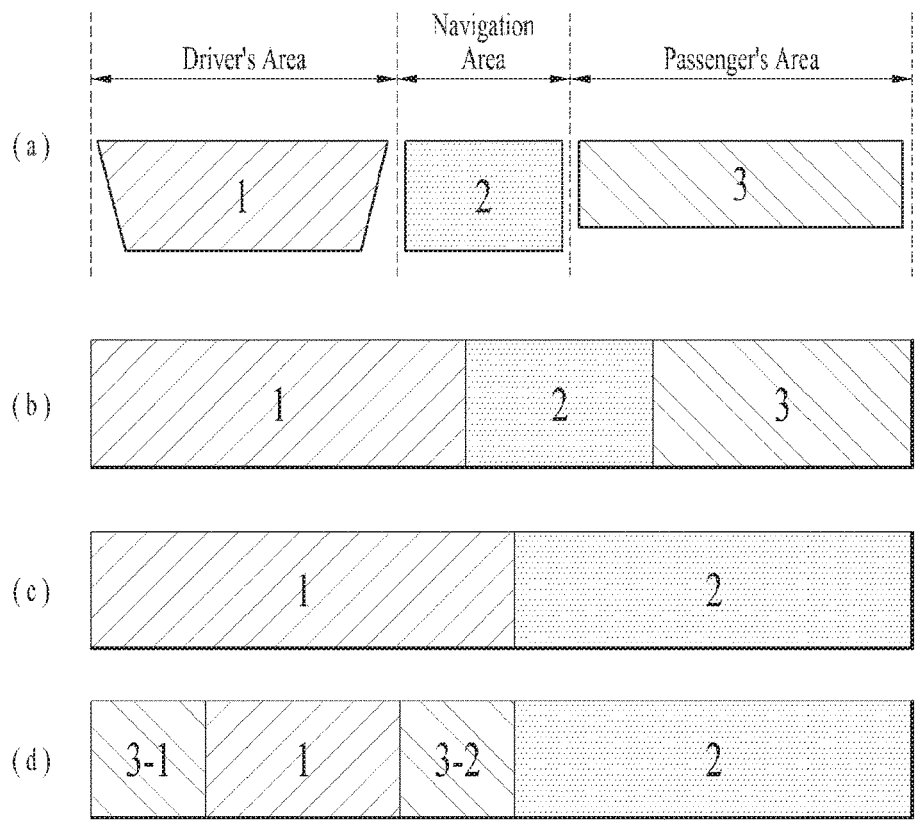
FIG. 7 is a diagram illustrating embodiments of a configuration of a display in a vehicle terminal according to the present invention.

FIG. 7 is a diagram illustrating a method for configuring a display in a vehicle terminal according to the present invention.

According to the present invention, the vehicle terminal may be provided in all places inside the vehicle. For example, it is general that the vehicle terminal is located on a dashboard of the vehicle or/and a rear portion of a seat. The dashboard is generally provided on an area corresponding to a front portion of the driver and its adjacent area. The vehicle terminal located on the rear portion of the seat may be provided in an embedded structure to the corresponding seat or a coupling structure of a separate display to the rear portion of the seat. Hereinafter, in this specification, the vehicle terminal provided on the dashboard will be described as an example for understanding of the present invention and convenience of description.

The vehicle terminal according to the present invention may be provided on the dashboard. The display of the vehicle terminal may include at least two data areas. One of the data areas may correspond to the driver data area, and the other one may correspond to the driving assist data area. The driving assist data area means a data area for assisting driving of the vehicle in addition to a main driving function of the driver as described above. Meanwhile, the display of the vehicle terminal may further include the passenger data area if the passenger exists in the vehicle.

The display of the vehicle terminal provided on the dashboard may be configured in a single body in hardware, or may be implemented to include one or more data areas for displaying the aforementioned data in software or virtually. Alternatively, the display of the vehicle terminal may be implemented in such a manner that each of one or more data areas may be configured in hardware.

Referring to FIG. 7a, the data area of the vehicle terminal on the dashboard is categorized into a driver data area, a driving assist data area, and a passenger data area.

FIG. 7b is almost identical to FIG. 7a but is different from FIG. 7a in size of the data area of the vehicle terminal.

Unlike FIGS. 7a and 7b, in FIG. 7c, the data area of the vehicle terminal on the dashboard is categorized into a driver data area and other area.

FIG. 7d is similar to FIG. 7c but further provides at least one data area in the driver data area as the case may be. The data area may be a form such as screen split implemented in a display of a general terminal, or may be implemented in hardware. Meanwhile, the data area may be an area to which data corresponding to an image that may be viewed through a side mirror, a room mirror, etc. of the vehicle are output.

Meanwhile, the driver data area is a data area corresponding to all functions that may be viewed or manipulated by the vehicle driver at a driver's seat, wherein the functions include a function of allowing a driver to view or manipulate at a driver's seat in a general vehicle.

The driving assist data area is an area for providing navigation data for a vehicle driver. In this case, the driving assist data area may provide data related to vehicle driving assistance except the aforementioned navigation data and the data provided by the driver data area. Meanwhile, in this case, the driving assist data corresponds to the other vehicle control function except the vehicle control function for the driver.

The passenger data area is the other area except the driver data area or/and the driving assist data area, and means an area for providing data for a passenger if the passenger exists in the vehicle. At this time, the passenger data area may provide data related to vehicle control equally to the driver data area or/and the driving assist data area. In this case, some data may be the same as or related to the data of the aforementioned areas.

Referring to FIG. 7, the display of the vehicle terminal may provide data including at least one area. However, in the area(s) within the display of the vehicle terminal, their positions or data may not always be fixed but be changed depending on a status during vehicle usage, for example, based on various factors such as before driving, during driving, and the presence of passenger.

Hereinafter, the method for controlling the display of the vehicle terminal in accordance with the present invention will be described.

The display of the vehicle terminal may be configured in various forms based on the status of the vehicle such as before driving, during driving, the presence of passenger, and termination of driving. However, for convenience, the case of during driving (including attempt to start driving) will be described as an example, particularly, methods for controlling the display of the vehicle terminal when a passenger in the vehicle is only a driver and when additional passenger exists will be described as examples. Meanwhile, since an owner of the vehicle is a driver in most cases, for convenience, the vehicle owner will be described as a driver. Also, for convenience, the passenger may mean a passenger except the driver, that is, vehicle passenger.

The vehicle may identify the passenger, that is, the presence of the passenger manually or automatically in accordance with a setup of the driver. For example, a passenger manual detect mode is set in the vehicle, the vehicle assumes the case that the driver only exists, that is, configures the display of the vehicle terminal for the driver only. However, at this time, the vehicle may change the configuration of the display of the vehicle terminal if a signal related to the presence of the passenger is received in accordance with manual setup of the driver.

Figure 8:
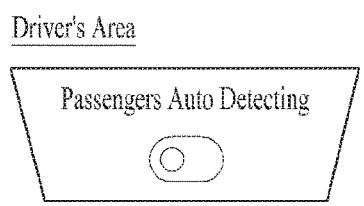
FIG. 8 is a diagram illustrating a recognition/identification mode of a passenger in a vehicle in accordance with the present invention.

On the contrary, as shown in FIG. 8, if a passenger automatic detect mode is set in the vehicle and a signal for starting of driving is received, the vehicle automatically detects and determines the vehicle passenger except the driver, that is, the presence of the passenger. In this case, the display of the vehicle terminal may be configured differently for the case that the driver only exists and the case that the passenger exists in the vehicle. That is, referring to FIG. 8, the vehicle driver may select and change the passenger detect mode manually or automatically.

For example, if the driver only exists in the vehicle in accordance with the aforementioned manual or automatic passenger detect mode, the vehicle may be provided in such a manner that the display of the vehicle terminal may be configured in the form of FIG. 7c or 7d. In this case, the display of the vehicle terminal may only provide the driver data area and the driving assist data area. By contrast, if at least one passenger except the driver exists in the vehicle, the display of the vehicle terminal may be configured to include the passenger data area as shown in FIGS. 7a to 7b not FIG. 7c or 7d. Meanwhile, in case of the latter case, the configuration of the display of the vehicle terminal may be changed based on at least one of the number of passengers, seat position of passenger, and authority of passenger. In other words, the presence of the passenger may not mean that the passenger data area is necessarily included in the display of the vehicle terminal.

The method for recognizing or/and identifying passenger in a vehicle in accordance with the present invention will be described. For example, recognition of the passenger may mean the presence of passenger in the vehicle, and identification of the passenger may mean the number of recognized passenger(s), seat position of the passenger, and authority of the passenger. However, the terms such as the recognition of the passenger and the identification of the passenger may be used without distinction of their meanings. In this case, the recognition of the passenger may include the identification of the passenger, and vice versa.

The recognition/identification of the passenger may be performed based on at least one of a weight sensor, a camera sensor (for example, 3D sensor), a temperature sensor, a thermal sensor, an audio (voice) sensor, a gyro sensor, an acceleration sensor, a smell sensor, and a fingerprint sensor, which are provided in the vehicle.

However, in this specification, the recognition/identification of the passenger will be described as being determined based on data sensed through the weight sensor provided in the vehicle, especially each set of the vehicle. However, the recognition/identification of the passenger may be performed by another sensor described above or combination with data sensed by another sensor. Also, the recognition/identification of the passenger may be performed through data communication such as pairing, connection, etc. with the mobile terminal owned or worn by the passenger together with or separately from the aforementioned sensor.

Figure 9:
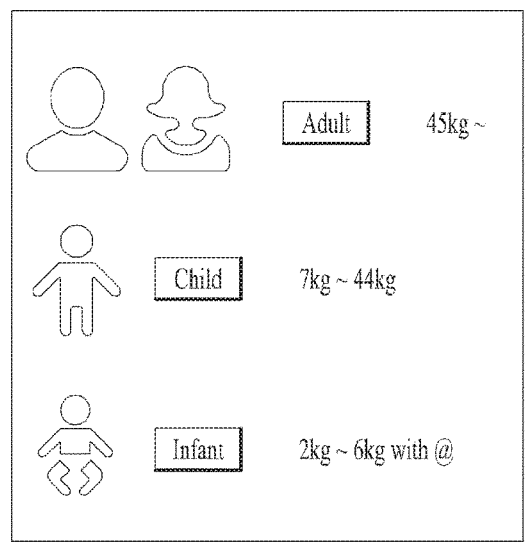
FIGS. 9 and 10 are diagram illustrating a method for recognizing/identifying a passenger in accordance with the present invention.
Figure 10:
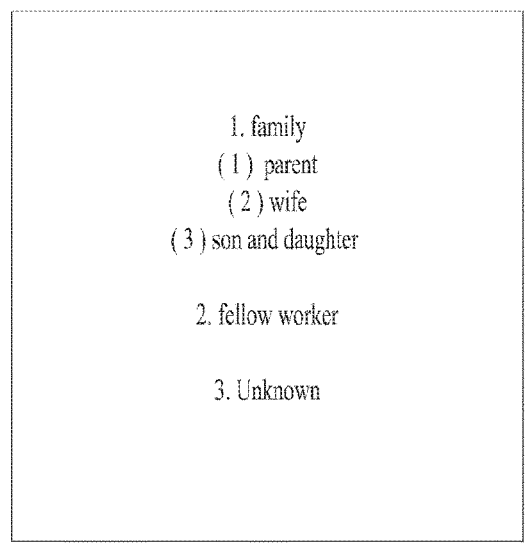

FIGS. 9 and 10 are diagram illustrating a method for recognizing/identifying a passenger in accordance with the present invention.

First of all, the vehicle may identify the presence of passenger, the number of passengers, seat position of passenger, and a passenger seat from data sensed through the seat weight sensor provided at the seat of the passenger, that is, weight data of the passenger.

Therefore, as described above, whether data are provided in the passenger data area in the display for the vehicle, and a type, attribute, etc. of data provided in the passenger data area may be determined.

Meanwhile, in FIG. 9, a corresponding passenger may be identified based on the data of the seat weight sensor.

For example, the vehicle may identify the passenger on the basis of data input or set by the user. If the passenger who gets on the vehicle at least once or more exists, the vehicle may store weight data of the corresponding passenger in the memory and use the weight data stored in the memory to identify the vehicle passenger later. In other words, after storing weight data of the passenger who gets on the vehicle once, in the memory, the vehicle identifies the corresponding passenger on the basis of the stored weight data when the passenger gets on the vehicle next time.

Meanwhile, there are various methods for identifying the passenger.

However, in identifying the passenger in FIG. 9, the vehicle classifies the passenger into adult, child, infant, etc. on the basis of the weight data sensed through the seat weight sensor. For example, the vehicle may classify the passenger into adult if the weight of the passenger is 45 kg or more, child if the weight of the passenger is between 7 kg and 44 kg, and infant if the weight of the passenger is 6 kg or less. Meanwhile, if an assistant seat for infant is installed in the seat, the vehicle may consider the weight of the assistant seat or regard the passenger of the corresponding seat as infant.

In this way, referring to FIG. 9, the vehicle has classified the passenger into adult, etc. on the basis of the weight of the passenger. Unlike FIG. 9, the vehicle classifies the passenger into family, fellow worker, unknown, etc. in FIG. 10.

Referring to FIG. 10, the passenger is classified into family, work, and unknown within a great category, which may mean a group. This is applicable to FIG. 8 or display data of this specification.

In other words, if family is selected, the vehicle may identify a sub-group such as parent, wife/husband, and son/daughter in accordance with family member. Also, in case of work, the vehicle may identify various types of sub-groups such as fellow worker, superior, junior, customer, etc. Also, unknown may mean a passenger who is not registered due to first boarding or a passenger who is not registered in spite of a previous boarding history.

In addition to FIGS. 9 and 10, there are various methods for identifying a passenger, and the present invention is not limited to the aforementioned description.

Meanwhile, a passenger who first gets on the vehicle may be determined appropriately based on weight data through the weight sensor. However, in case of a passenger having a boarding history of the vehicle or a registered passenger, there may be an error in exactly identifying the passenger having a boarding history of the vehicle or the registered passenger by using the measured weight sensor data only. For example, if a previous weight of the registered passenger is different from a weight of the registered passenger at a boarding time, the vehicle may recognize the same passenger as another passenger or unknown. On the contrary, if the weight of the registered passenger is the same as a weigh of another passenger, the vehicle may recognize another passenger as the registered passenger in error. Therefore, the vehicle may determine the passenger by applying an error to weight data of the passenger or identify the passenger with further reference to data sensed through at least one or more other sensors. Alternatively, the vehicle may identify the passenger through the mobile terminal (including wearable device) of the passenger together with or regardless of the sensing data.

In this specification, the description of the passenger may be applied to the driver in the same or similar manner.

Hereinafter, various embodiments of a method for controlling a vehicle or display when at least one or more passengers exist as well as a case that a driver only exists in the vehicle will be described based on the aforementioned description.

In this specification, the method for controlling the vehicle or display will be described by varying authority of a corresponding passenger in accordance with the identified passenger. For example, if a passenger having a previous boarding history or a registered passenger is identified, the vehicle may provide a personalized or customized service (hereinafter, referred to as 'customized service) for vehicle usage such as driving of the corresponding passenger.

This customized service may be defined or implemented in various manners depending on the number of passenger(s), position of passenger(s), priority of passenger(s), environment or condition inside/outside the vehicle, stability in driving of the vehicle, the presence of a paired or connected terminal or/and its usage.

Hereafter, the authorization setting method about passengers in the vehicle is described in the specification. However, it is arbitrary and the scope of right of present invention is not limited to the method described in the specification.

Hereinafter, various embodiments of a method for controlling a vehicle including a display of a vehicle terminal will be described. This method for controlling a vehicle relates to personalized data provision of driver/passenger, a control of a content provided to a data area of the vehicle terminal, data communication between a vehicle terminal and a mobile terminal, etc.

Figure 11:
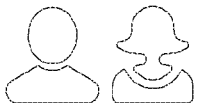
FIG. 11 is a diagram illustrating a method for configuring a passenger authority of a vehicle according to the present invention.
Figure 12:
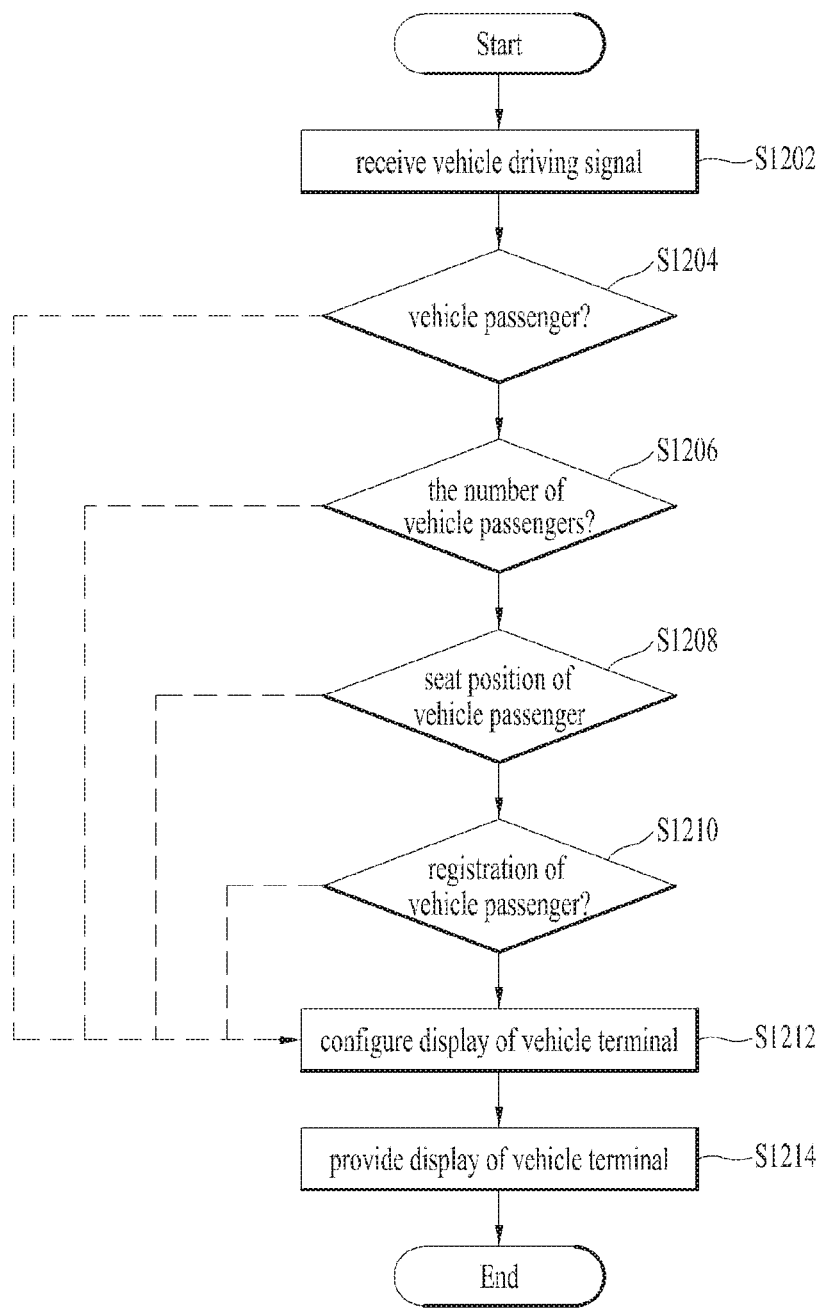
FIG. 12 is a flow chart illustrating a method for recognizing/identifying a vehicle passenger and controlling a display of a vehicle terminal in accordance with the present invention.

FIG. 11 is a diagram illustrating a method for configuring a passenger authority of a vehicle according to the present invention, and FIG. 12 is a flow chart illustrating a method for recognizing/identifying a vehicle passenger and controlling a display of a vehicle terminal in accordance with the present invention.

As described above, the vehicle identifies a vehicle passenger in addition to a driver during starting of driving. A configuration of the display of the vehicle terminal may be changed depending on the identified driver and the identified vehicle passenger.

In this case, recognition and identification of the vehicle passenger includes the number of passenger(s), position of passenger(s), etc.

Referring to FIG. 11, information on the driver/passenger recognized by the vehicle may be provided to at least one of data areas of the vehicle terminal.

If it is recognized that the passenger exists, the vehicle identifies the recognized passenger. At this time, if the recognized passenger is identified, the vehicle provides various menus to set authority of the identified passenger. However, if the recognized passenger is not identified, the vehicle may process the passenger as unknown and provide a menu for registration as the vehicle passenger.

Meanwhile, if the identified passenger is already registered and authority setup of the identified passenger is completed, the vehicle may notify the authority setup in advance.

In FIG. 11, information on the recognized/identified passenger and data such as icon for registration in case of a passenger who is not registered may be provided to a first sub area 1110 in the data area of the vehicle terminal.

Meanwhile, authority setup details related to usage of vehicle functions are provided to a second sub-area 1120 in the data area of the vehicle terminal.

FIG. 12 is a flow chart illustrating a method for controlling a display of a vehicle terminal and a vehicle as described above.

If a vehicle driving start signal is input (S1202), the vehicle determines the presence of a vehicle passenger in addition to a driver (S1204).

As a result of the step S1204, if the vehicle passenger in addition to the driver is recognized, the vehicle determines the number of the recognized vehicle passenger (S1206). At the same time, the vehicle determines a seat position of the recognized vehicle passenger (S1208). In this case, the step S1206 may be bypassed depending on the system.

As a result of the step S1206, if the number of the recognized vehicle passenger is plural, the vehicle determines whether each recognized vehicle passenger is registered in the vehicle S1210.

As a result of the step S1208, if a recognized passenger's seat location is identified, the vehicle determines whether to register the identified vehicle passengers in the vehicle S1210.

Also, as a result of the step S1206, if at least one of the recognized vehicle passengers is registered, the vehicle configures the display of the vehicle terminal with reference to the authority setup details previously set for the corresponding registered passenger S1212.

The vehicle provides data according to the above configuration to the data area of the vehicle terminal S1214.

Meanwhile, as a result of the step S1208, if the seat of the vehicle passenger is not the seat next to the driver, the vehicle may configure the display of the vehicle terminal in the same manner as the case that the driver only gets on the vehicle regardless of the registration of the vehicle passenger. However, in this case, if the authority setup details of the vehicle passenger, which are previously registered, exist even though the vehicle passenger gets on a back seat of the vehicle, the vehicle may provide some or all of the authority setup details to the display of the vehicle terminal related to the corresponding seat.

Alternatively, as a result of the step S1208, if the seat of the vehicle passenger is next to the driver, the vehicle configures the display of the vehicle terminal correspondingly S1212, and provides the data according to the configuration to the data area of the vehicle terminal S1214.

In this case, if the vehicle passenger next to the driver is a passenger which is not registered in the vehicle, the vehicle may first provide data for registration guide and authority setup in configuring the display of the vehicle terminal in the step S1212.

However, if the vehicle passenger next to the driver is a passenger which is registered in the vehicle, the vehicle may directly provide the display of the vehicle terminal that reflects the authority setup details.

Although the description related to vehicle functions has been made in FIG. 11 with respect to the authority of the passenger registered in the vehicle, authority setup related to various contents may be made.

After recognizing/recognizing and identifying the aforementioned vehicle passenger, the vehicle may perform the authority setup differently depending on the identified vehicle passenger. This authority setup may be performed manually or automatically.

For example, if the recognized vehicle passenger is identified as adult, the vehicle may allocate usage authority in the vehicle to the corresponding passenger as full authority. In this case, it is preferable that the full authority is the same as or more restrictive than the authority of the driver. However, if the recognized vehicle passenger is identified as child or infant, the vehicle may allocate usage authority in the vehicle to the corresponding passenger as partial authority, minimized authority, or no authority. If the recognized vehicle passenger is identified as child or infant, the child or infant is likely to be lack of knowledge of the vehicle or do a wrong selection, whereby accident may occur during driving of the vehicle. For this reason, the usage authority of the child or infant is set to partial authority, minimized authority, or no authority to prevent such accident from occurring.

As another authority setup, the identified vehicle passenger is categorized into woman and man on the basis of gender, whereby usage authority in the vehicle or usable content may be set in advance and provided. For example, when it is intended to play music during driving of the vehicle, music of genre corresponding to ballad may first be played if the identified vehicle passenger is woman, and music of genre corresponding to rock may first be played if the identified vehicle passenger is man.

In addition, authority setup may be performed with reference to the presence of family in addition to age and gender of the identified vehicle passenger, and the display of the vehicle terminal customized for the passenger according to the authority setup may be configured.

Meanwhile, even though only one recognized vehicle passenger exists or a plurality of recognized vehicle passengers exist, the usage authority of the display of the vehicle terminal may be configured differently based on the identified result of the vehicle passenger.

For example, even though only one recognized vehicle passenger exists, the usage authority of the display of the vehicle terminal may be configured differently based on a priority of the vehicle passenger identified from a relation with the driver. For example, if a priority of the vehicle passenger in addition to the driver is higher than the driver, the display of the vehicle terminal including an area for the vehicle passenger may be configured, and in opposite case, the display of the vehicle terminal including an area for the driver only may be configured.

Also, if a plurality of vehicle passengers are recognized, whether to configure the usage authority of the display of the vehicle terminal on the basis of which one of the identified vehicle passengers may be determined based on the priority of the identified vehicle passengers. For example, if it is assumed that three vehicle passengers exist, the display of the vehicle terminal may be configured based on the vehicle passenger of the highest priority. In this case, if a seat position of the vehicle passenger having the highest priority is not a position next to the driver or the vehicle passenger has a priority lower than the driver, the display of the vehicle terminal including an area for the driver only may be configured instead of the display of the vehicle terminal including an area for the passenger.

Figure 13:
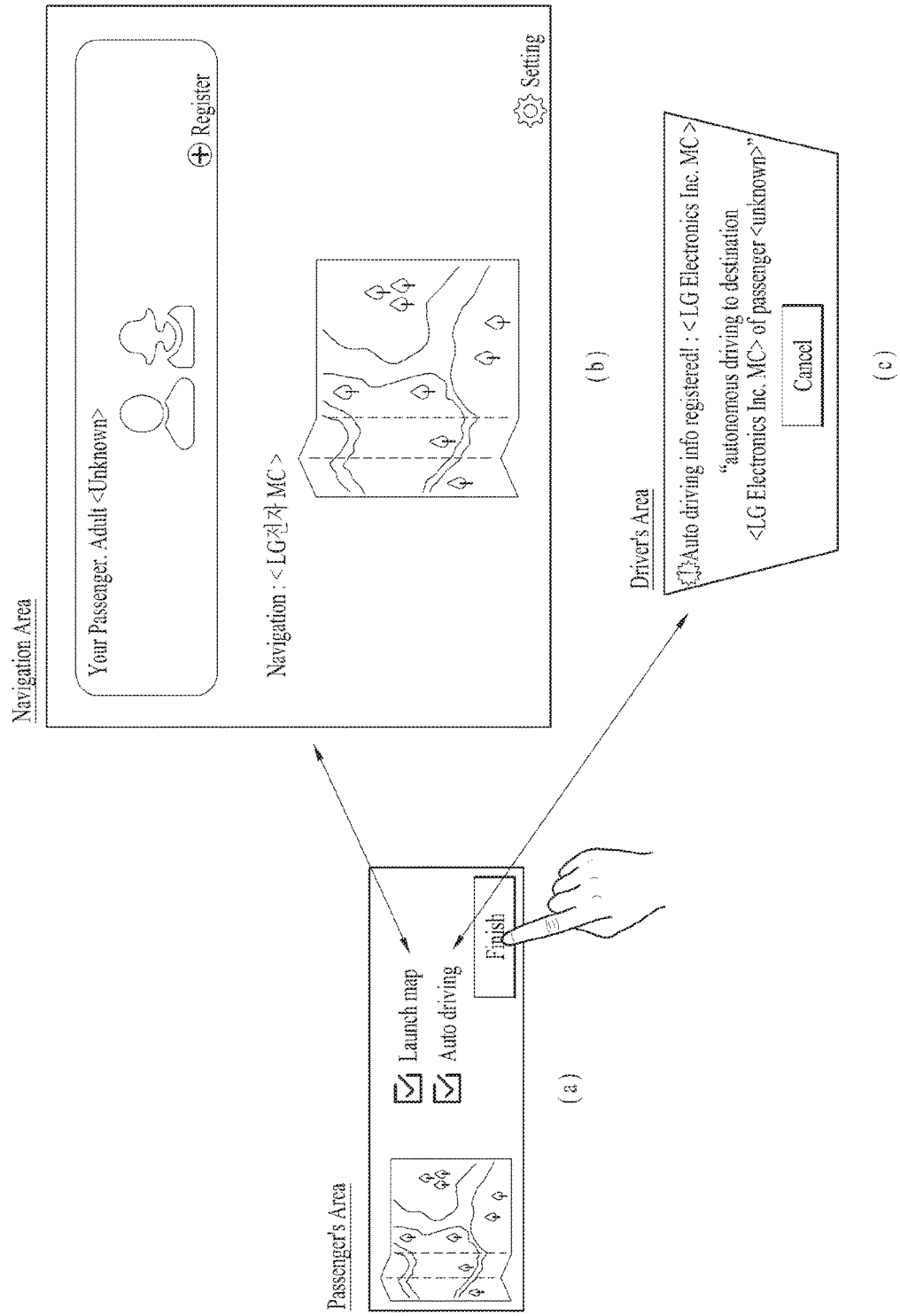
FIG. 13 is a diagram illustrating a method for controlling a display of a vehicle terminal in accordance with the present invention.

Referring to FIG. 13a, navigation data may be provided to the passenger data area of the data area of the vehicle terminal. In this case, the vehicle passenger has usage authority related to navigation, for example.

Referring to FIG. 13b, a launching list of map data and an auto driving list may be provided with respect to the navigation data.

If a launching list selection signal of the map data is selected from the navigation data of the passenger data area, the vehicle provides the map data to the passenger data area or another area, for example, the driving assist data area not the passenger data area of the vehicle terminal as shown in FIG. 13b. The passenger or the driver may set the navigation data such as destination and path on the basis of the map data provided as above. At this time, the navigation data may be provided or stored together with the data of the vehicle passenger, whereby the corresponding data may be recommended and used if the corresponding vehicle passenger is identified later.

However, if the auto driving list selection signal of the navigation data of the passenger data area is received, the vehicle may provide data of FIG. 13c to the driver data area or the driving assist data area. The data of FIG. 13c may include vehicle passenger information, destination information, and auto driving request information. In this case, the driver may grant or reject the request of FIG. 13c.

As described above, the vehicle may use the mobile terminal owned by the vehicle passenger in identifying the recognized vehicle passenger.

Figure 14:
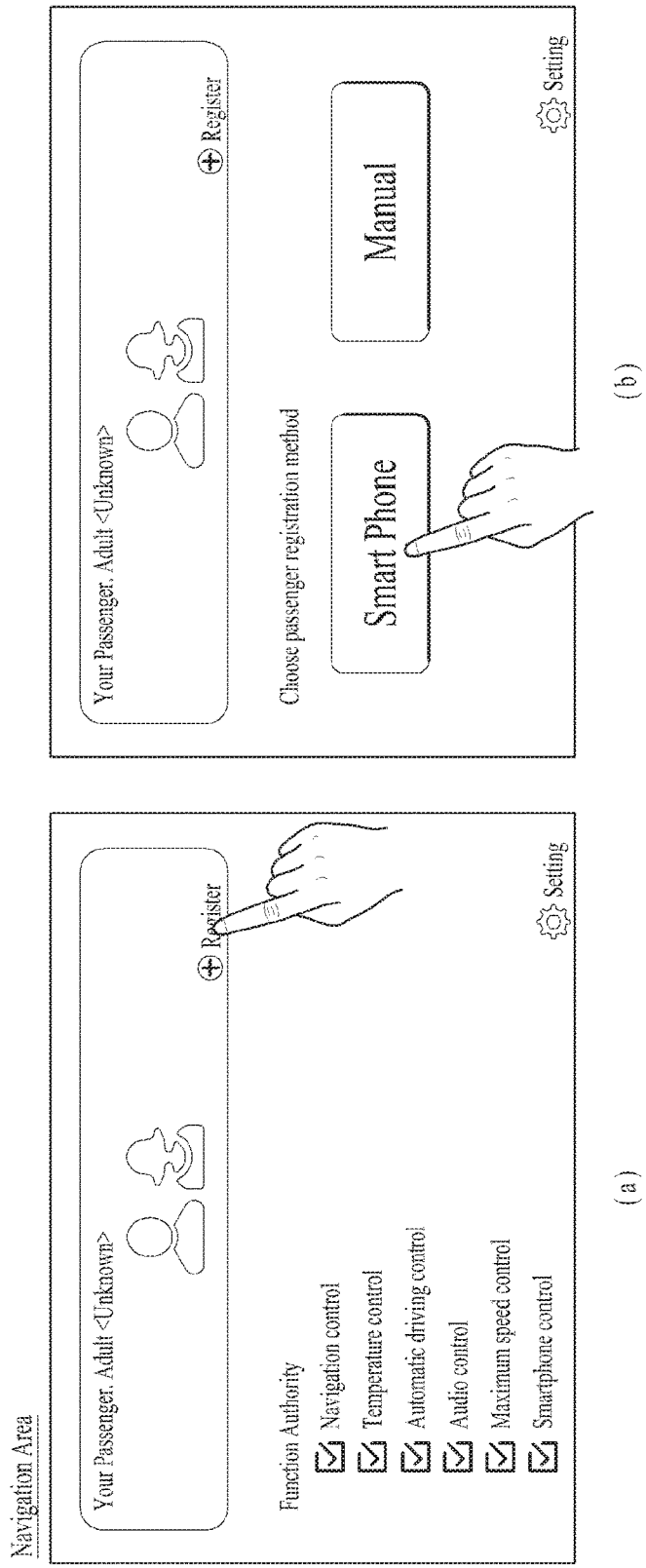
FIG. 14 is a diagram illustrating a method for recognizing/identifying a vehicle passenger through interworking with a mobile terminal in accordance with the present invention.

FIG. 14 is a diagram illustrating a method for recognizing/identifying a vehicle passenger through interworking with a mobile terminal in accordance with the present invention.

In FIG. 14a, if a vehicle passenger which is not registered is identified, the vehicle may provide data to one of the data areas of the vehicle terminal.

Referring to FIG. 14a, the vehicle may provide data as to registration of the identified vehicle passenger in the vehicle and authority setup list of the corresponding vehicle passenger.

Unlike FIG. 14a, in recognizing and identifying the vehicle passenger in FIG. 14b, the vehicle passenger or the driver may directly register the corresponding vehicle passenger manually or select whether to register the corresponding vehicle passenger through a mobile terminal such as a smart phone.

In case of the latter case, it is possible to avoid error operation in providing data, which may occur as a heavy object or nonliving things may simply be recognized as the vehicle passenger in accordance with the weight sensing data when the vehicle passenger is recognized/identified using the weight sensing data through the aforementioned weight sensor of the seat.

Figure 15:
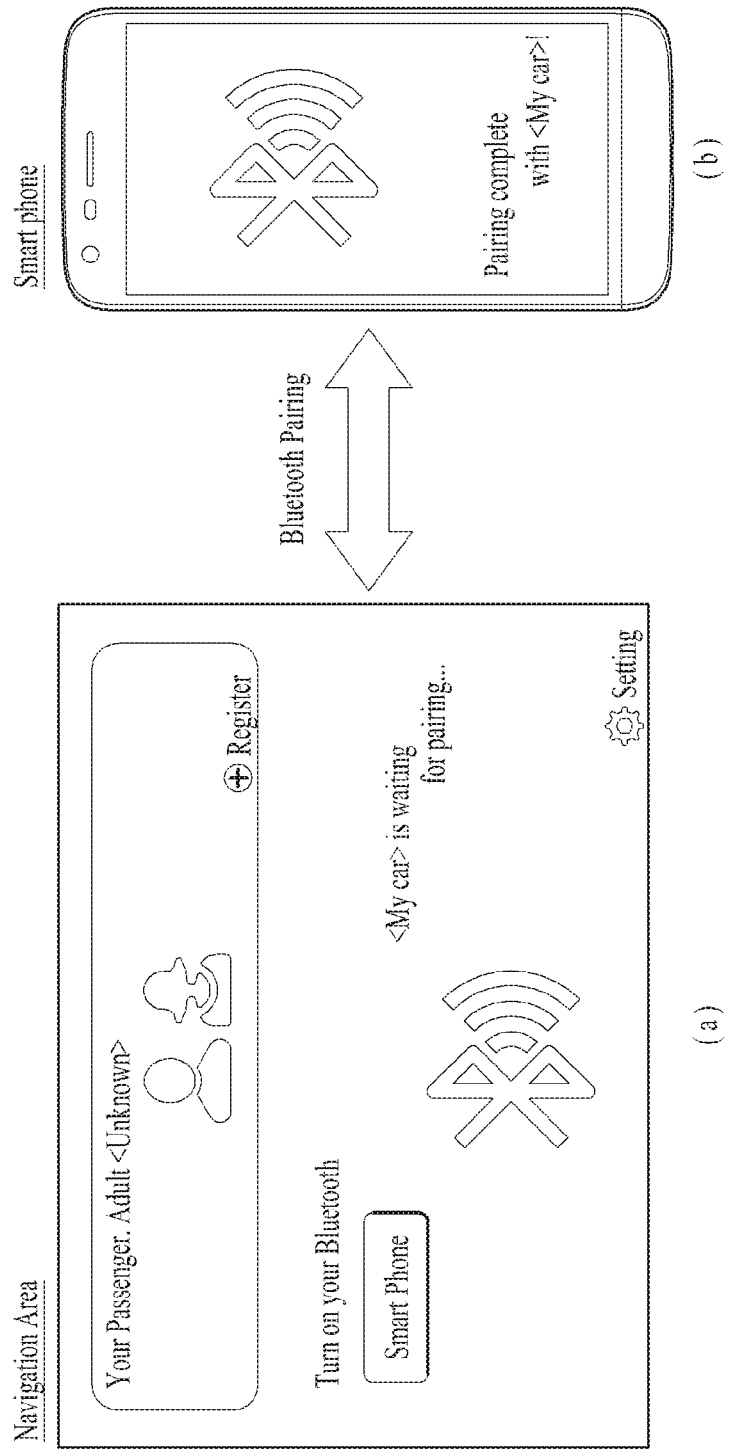
FIG. 15 is a diagram illustrating a method for recognizing/identifying a vehicle passenger using a mobile terminal in accordance with the present invention.

FIG. 15 is a diagram illustrating a method for recognizing/identifying a vehicle passenger using a mobile terminal in accordance with the present invention.

In FIG. 15, the mobile terminal of the passenger in the vehicle is recognized and identified when a mobile terminal item is selected in FIG. 14b.

As shown in FIG. 15a, the vehicle broadcasts or advertises a signal to determine the presence of the mobile terminal within a certain range in accordance with a predetermined communication protocol. In FIG. 15b, if the broadcasting or advertising signal transmitted from the vehicle is received in the mobile terminal, pairing between the vehicle and the mobile terminal is performed by a response of the mobile terminal. Meanwhile, Bluetooth or WiFi may be used as the predetermined communication protocol on the assumption of the vehicle inside or periphery. For convenience, Bluetooth is shown in FIG. 15 as an example.

After pairing is performed once as above, if the passenger having the mobile terminal enters the vehicle periphery or the vehicle inside, the vehicle may recognize and identify the vehicle passenger by previously performing pairing even without a separate operation or input of the driver or the vehicle passenger and configure the display of the vehicle terminal on the basis of the recognized/identified result.

Meanwhile, when the mobile terminal is used in recognizing/identifying the vehicle passenger to drive the vehicle, if one mobile terminal or a plurality of mobile terminals for pairing exist, the display of the vehicle terminal may be configured as described above. For example, if one mobile terminal for pairing exists, the vehicle may determine a priority of the vehicle passenger identified through the mobile terminal and the driver and configure the display of the vehicle terminal as described above in accordance with the determined result. Also, if a plurality of mobile terminals for pairing exist, the vehicle may configure the display of the vehicle terminal on the basis of the passenger having the highest priority among the plurality of vehicle passengers identified through the plurality of mobile terminals. Meanwhile, if a seat position of the vehicle passenger having the highest priority is not a position next to the driver or the vehicle passenger has a priority lower than the driver, the display of the vehicle terminal may be configured unlike the aforementioned method.

Figure 16:
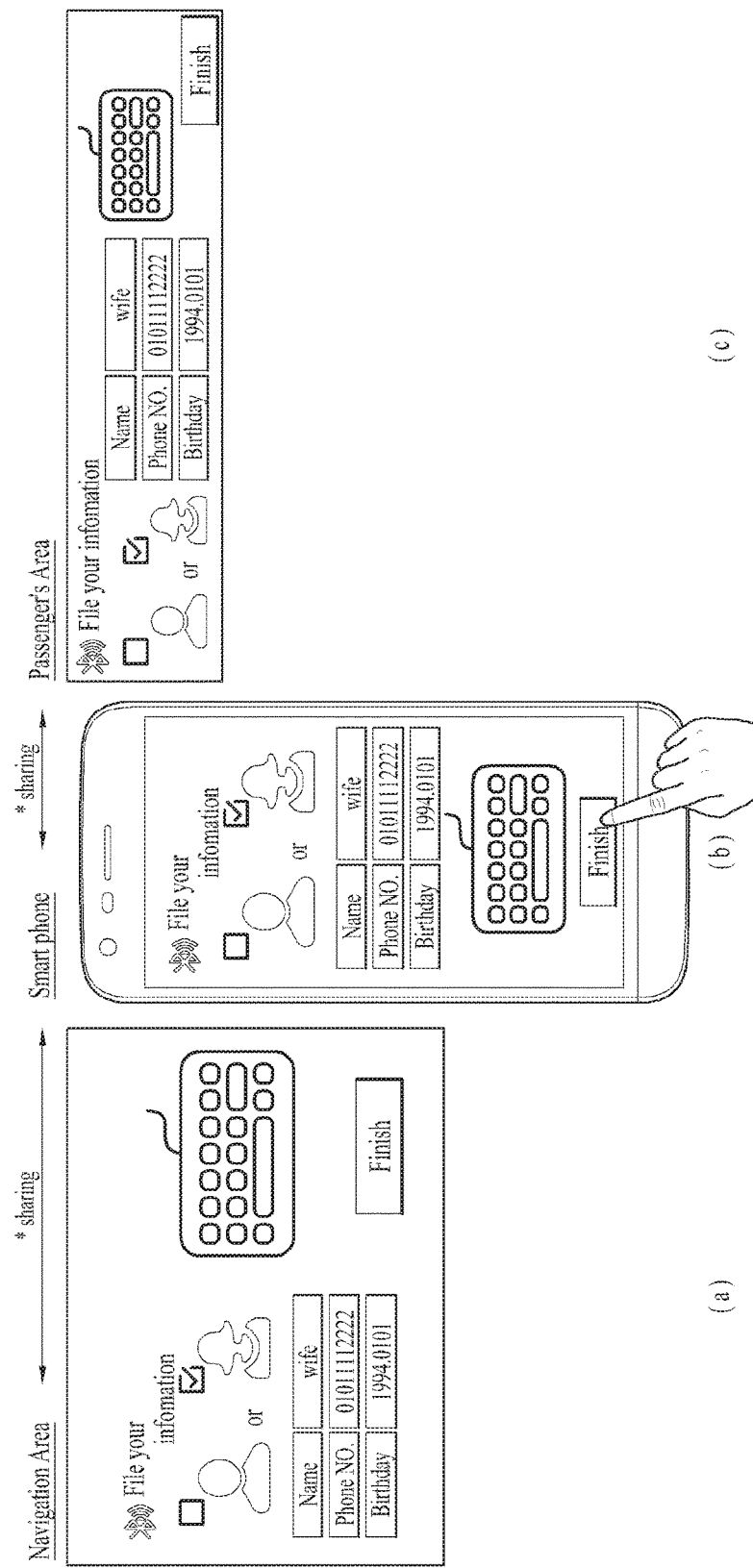
FIGS. 16 and 17 are diagrams illustrating a data communication method of a vehicle and a mobile terminal in accordance with the present invention.
Figure 17:

FIGS. 16 and 17 are diagrams illustrating a data communication method of a vehicle and a mobile terminal in accordance with the present invention.

FIGS. 16a and 16b are more detailed diagrams illustrating a method for registering a passenger on a display of a vehicle terminal, and FIG. 16c illustrates a display of a vehicle terminal for an area where passenger information registered in accordance with FIGS. 16a and 16b is provided.

The method for registering a passenger on the display of the vehicle terminal may include a method for performing passenger registration through an input of data provided to the display of the vehicle terminal, such as a direct touch as shown in FIG. 16a, and a method for performing passenger registration through a mobile terminal paired as shown in FIG. 16b.

In FIG. 16, as input items related to the vehicle passenger registration, passenger name or nickname, phone number of the passenger, and birthday of the passenger are shown. However, in the present invention, the input items related to the vehicle passenger registration are not limited to those shown in FIG. 16. For example, the input items related to the vehicle passenger registration may include weight data sensed through the weight sensor with respect to the corresponding passenger, and other authority request data, as described above.

In addition, various kinds of information related to preferred functions of the corresponding passenger, preferred data of the corresponding passenger, etc. may be input during the passenger registration of the vehicle, as shown in FIG. 17. The preferred data may include music genre preferred by the corresponding passenger during boarding, desired video data, etc. The preferred functions may include functions preferred by the vehicle passenger among the vehicle functions, for example, navigation function, air-condition temperature control function, radio frequency setup function, and details related to seat forward and backward positions and seat slope. At this time, some or all of the preferred functions may automatically input or set and stored in the vehicle in accordance with function usage of the corresponding passenger even without separate setup, and may be used as they are when the corresponding passenger again gets on the vehicle later.

In addition, items for input are provided in FIG. 16a, and if each item is input through the mobile terminal of FIG.

16b, data of the corresponding item may automatically be input to the display of the vehicle terminal as shown in FIG. 16c.

Figure 18:
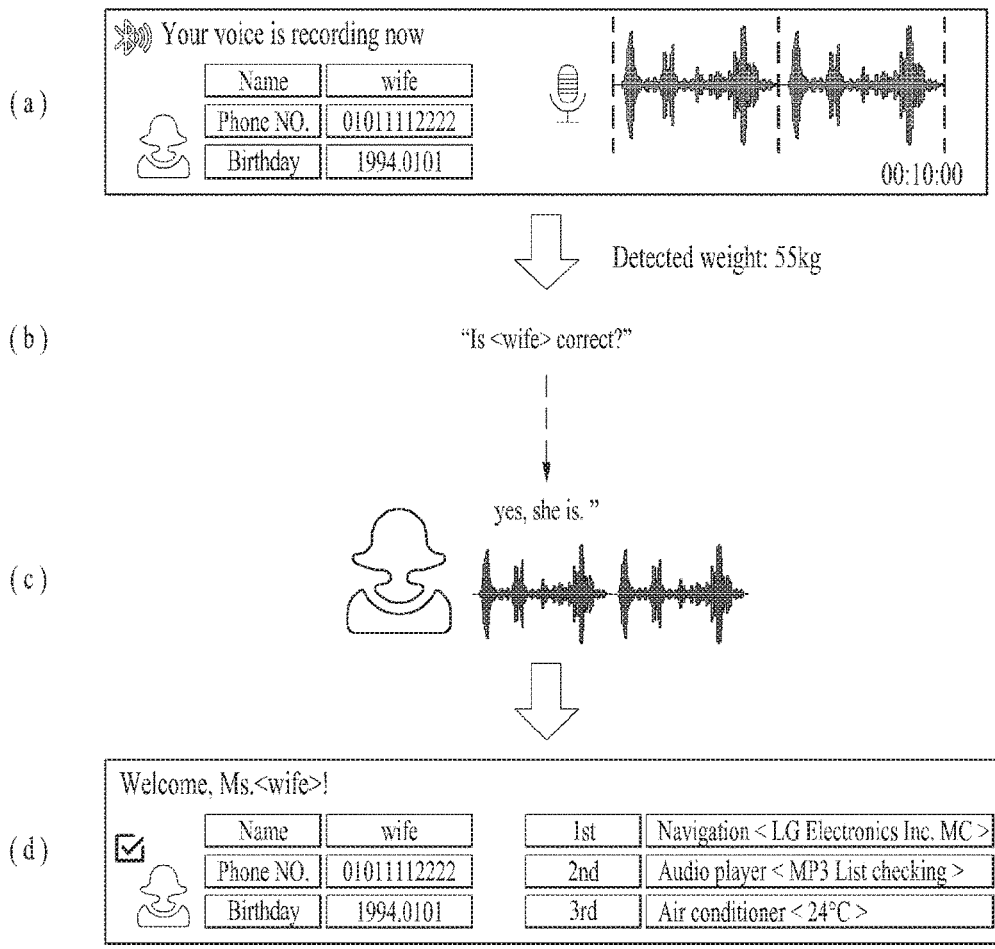
FIGS. 18 and 19 are diagrams illustrating a method for recognizing a vehicle passenger according to the present invention.
Figure 19:

FIGS. 18 and 19 are diagrams illustrating a method for recognizing a vehicle passenger according to the present invention.

FIG. 18 relates to a method for identifying a vehicle passenger sensed through a voice recognition sensor provided in a vehicle through voice recognition of the corresponding vehicle passenger, and FIG. 19 relates to a method for identifying a corresponding vehicle passenger by transmitting pre-registered unique data to a mobile terminal of the corresponding vehicle passenger when the corresponding vehicle passenger enters the vehicle.

Referring to FIG. 18a, when the passenger enters the vehicle, the vehicle senses various kinds of data and collects the sensed data. For example, if the passenger sits in the seat, the vehicle senses and collects position of the corresponding seat, weight data of the passenger, and voice data of the passenger, etc.

The vehicle recognizes the corresponding passenger on the basis of the collected data and identifies the recognized passenger. The vehicle determines authenticity of the identified passenger through a display or speaker of the vehicle terminal as shown in FIG. 18b to identify that the identified passenger is the determined passenger. As shown in FIG. 18c, if it is identified that the corresponding passenger is the determined passenger through feedback of the passenger, the vehicle reads data of the corresponding passenger previously stored in the memory and configures passenger data area data for the identified passenger as shown in FIG. 18d, whereby the display for the vehicle terminal is configured, provided and controlled.

Referring to FIG. 19, the method of FIG. 19 may be performed together with or separately from that of FIG. 18. Even though the vehicle passenger is registered in the vehicle, since personal information of the passenger is unique, if this personal information is provided in error, personal information of the corresponding passenger may be leaked. Therefore, the vehicle may generate and use temporary data on the basis of registration information of the passenger, wherein the temporary data is different from the registration information of the passenger.

For example, if a mobile terminal number of the registered passenger is 010-1234-5678, the vehicle may provide the display of the vehicle terminal by changing or processing the mobile terminal number of the registration passenger to 010-9876-5432 or as 010-1234-xxxx. Alternatively, the vehicle may process the mobile terminal number of the corresponding passenger in block. Meanwhile, the vehicle may process the mobile terminal number of the corresponding passenger 010-9876-5432 or 010-1234-xxxx and provide the processed mobile terminal number on the display of the vehicle terminal in identifying the corresponding passenger through the mobile terminal even though the vehicle calls 010-1234-5678. The vehicle may attempt to call as described above to grant the call of a corresponding user or receive voice or fingerprint data of the corresponding user after grant of the call, thereby identifying the corresponding user, that is, the passenger.

Meanwhile, although the call is performed using a temporary number or partially blocked phone number in the aforementioned description, text data through SMS, MMS, SNS, etc. may be used.

FIG. 20 is a diagram illustrating a method for processing a call when a driver or passenger receives the call during driving of a vehicle according to the present invention.

FIG. 20 is a diagram illustrating a method for processing a call when a driver or at least one passenger receives the call from other people during driving of a vehicle according to the present invention.

If an outside person who calls the call is included in passenger information of the vehicle, the vehicle may provide detailed information of the outside person as shown in FIG. 20. However, if not so, only a phone number may be provided unlike FIG. 20.

A method for processing a call when a mobile terminal of a driver receives the call in FIG. 20a is as follows.

At this time, the driver may directly attempt the call by using his/her mobile terminal shown in FIG. 20b or through earphone, Bluetooth, etc. in accordance with a setup which is previously set.

However, if the driver directly attempts the call, since a risk of accident during driving is increased, information on the person who calls the driver may be provided on a driver/driving assist data area within the display of the vehicle terminal shown in FIG. 20a or a passenger data area within the display of the vehicle terminal shown in FIG. 20d and at the same time entity of the call may be selected.

In this case, if the driver or the passenger selects the passenger not the driver, the vehicle may process the corresponding call to allow the passenger to receive the corresponding call on the basis of information of the passenger, which is previously registered in the vehicle. In this respect, the vehicle may receive the call data through the mobile terminal of the driver or the mobile terminal of the passenger. In this case, the vehicle may be processed to be disconnected from the call request for the mobile terminal of the driver in accordance with the above selection and to be connected to the mobile terminal of the passenger. At this time, the disconnected/connected may only be a display on the corresponding mobile terminal, and may not mean fully disconnected/connected. In addition, the disconnected/connected may be changed depending on a communication protocol which is used.

Meanwhile, although the case of a call application such as a call is exemplarily described in FIG. 20, various applications installed in the mobile terminal of the driver or the passenger or the vehicle may be processed using the aforementioned method.

Meanwhile, in this specification, based on the registration information such as the vehicle passenger, the set and registered details may be changed appropriately in accordance with various events that may occur when driving of the vehicle starts or during driving of the vehicle. Also, the vehicle may seek the passenger's convenience by learning a usage pattern of the passenger during boarding of the passenger on the vehicle even though there is pre-registered information of the passenger and reflecting the learned details during driving of the vehicle or later boarding of the corresponding passenger on the vehicle.

Meanwhile, each area in the display of the vehicle terminal in FIG. 7 may be processed in such a manner that its display position or data may be switched or changed by the driver or the passenger.

In addition, the vehicle may randomly change some of passenger data registered as vehicle passenger. For example, the vehicle may set and change some of pre-registered data on the basis of data of environment inside or/and outside the vehicle. For example, although the passenger sets an air-conditioner temperature at 18° C. in summer, a change of this setup is required in winter. Therefore, an appropriate change corresponding to the above setup details may be made based on this information. The environment inside or/outside the vehicle may include at least one of boarding time or current time, the number of passengers, vehicle status, current weather, and current driving area as well as the above season.

The disclosure of the driver or the passenger in this specification is applicable to both the passenger and the driver, and the disclosure based on one drawing may configure one embodiment by means of combination with another drawing.

Therefore, according to the aforementioned various embodiment of the present invention, the method for configuring and controlling the display of the advanced vehicle terminal may be provided. A passenger except a driver in a vehicle may be recognized/identified in accordance with at least one of the various embodiments of the present invention and the display of the vehicle terminal for the identified passenger may be configured and provided, whereby convenience in using the vehicle of all passengers boarding on the vehicle may be provided.

The display apparatus and the method for controlling the same disclosed in this specification are not limited to the aforementioned embodiments, and all or some of the aforementioned embodiments may selectively be configured in combination so that various modifications may be made in the aforementioned embodiments.

Meanwhile, the operation method of the display apparauts disclosed in this specification may be implemented in a recording medium, which may be read by a processor provided in the digital device, as a code that can be read by the processor. The recording medium that can be read by the processor includes all kinds of recording media in which data that can be read by the processor are stored. Examples of the recording medium include a ROM, a RAM, a CD-ROM, a magnetic tape, a floppy disk, and an optical data memory. Also, another example of the recording medium may be implemented in a shape of carrier wave such as transmission through Internet. Also, the recording medium that can be read by the processor may be distributed in a computer system connected thereto through a network, whereby codes that can be read by the processor may be stored and implemented in a distributive mode.

Although the embodiments of the present invention have been described in this specification with reference to the accompanying drawings, the embodiments are only exemplary and the present invention is not limited to a specific embodiment. Various modifications made by those skilled in the art to which the present invention pertains belong to the scope of claims. Also, such modifications should not be understood individually from technical spirits of the present invention.

What is claimed is:

1. A display device for displaying information of a vehicle, the display device comprising:
   a display;
   a memory configured to store registration information for a passenger, the registration information including weight data, voice recognition data, age data and gender data of the passenger;
   a weight sensor configured to detect weight of the passenger sitting on a seat of the vehicle;
   a microphone configured to receive a voice of the passenger sitting on the seat of the vehicle; and
   a controller configured to:
   cause the display to display a first data region, the first data region including driver data;
   determine whether the detected weight of the passenger corresponds to the weight data included in the registration information;
   when the detected weight of the passenger corresponds to the weight data, determine whether the received voice of the passenger corresponds to the voice recognition data included in the registration information; and
   when the received voice of the passenger corresponds to the voice recognition data, determine a seat position of the passenger;
   when the seat position of the passenger is not next to a seat of a driver of the vehicle, cause the display to continue to display the first data region and not display a second data region for providing data associated with the passenger; and
   when the seat position of the passenger is next to the seat of the driver of the vehicle, cause the display to display the second data region for providing data associated with the passenger based on the registration information,
   wherein the second data region provides the data differentially according to an age and a gender of the passenger based on the age data and the gender data of the passenger included in the registration information.

2. The display device according to claim 1, wherein the controller is further configured to:
   cause the display to display a third data region including driving assist data,
   wherein the first data region and the third data region are positioned to be viewable by the driver of the vehicle, and wherein the second data region is positioned to be viewable by the passenger.

3. The display device according to claim 2, wherein the controller is further configured to:
   cause the display to display at least one of the first data region or the third data region, and not display the second data region, when only the driver, and not any passengers, is present in the vehicle.

4. The display device according to claim 2, wherein the controller is further configured to:
   cause the display to display at least one of the first data region or the third data region, and display the second data region, when the driver and the passenger are present in the vehicle.

5. The display device according to claim 2, wherein the controller is further configured to:
   cause the display to change relative positions of the first data region, the second data region, and the third data region.

6. The display device according to claim 2, wherein the controller is further configured to:
   reconfigure the first data region, the second data region, and the third data region according to a determined priority of either the driver or the passenger.

7. The display device according to claim 6, wherein the controller is further configured to:
   adjust access authority of the display differently depending on the determined priority.

* * * * *